(12) United States Patent
Nishioka et al.

(10) Patent No.: US 7,405,884 B2
(45) Date of Patent: Jul. 29, 2008

(54) OPTICAL APPARATUS

(75) Inventors: Kimihiko Nishioka, Hachioji (JP); Miyuki Murakami, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/957,471

(22) Filed: Sep. 21, 2001

(65) Prior Publication Data
US 2002/0118464 A1    Aug. 29, 2002

(30) Foreign Application Priority Data
Dec. 21, 2000 (JP) .............................. 2000-388165
Jan. 18, 2001 (JP) .............................. 2001-009951

(51) Int. Cl.
*G02B 1/06* (2006.01)
*G02B 26/00* (2006.01)

(52) U.S. Cl. ....................... 359/665; 359/291; 359/676; 359/872; 359/295; 359/298

(58) Field of Classification Search ......... 359/665–667, 359/642, 676, 872, 290–292, 295, 298, 223, 359/224; 250/474.1
See application file for complete search history.

(56) References Cited

U.S. PATENT DOCUMENTS

| | | | | |
|---|---|---|---|---|
| 2,632,045 A | * | 3/1953 | Sziklai | 348/817 |
| 3,121,169 A | * | 2/1964 | Benton | 398/201 |
| 4,238,793 A | * | 12/1980 | Hochstrate | 345/102 |
| 4,289,379 A | * | 9/1981 | Michelet | 359/666 |
| 4,494,003 A | * | 1/1985 | Hager et al. | 250/474.1 |
| 4,989,958 A | * | 2/1991 | Hamada et al. | 359/666 |
| 5,629,790 A | * | 5/1997 | Neukermans et al. | 359/224 |
| 5,682,447 A | * | 10/1997 | Kuzyk et al. | 385/13 |
| 5,712,692 A | * | 1/1998 | Kanagawa et al. | 348/790 |
| 5,739,959 A | * | 4/1998 | Quaglia | 359/666 |
| 5,748,382 A | * | 5/1998 | Maguire, Jr. | 359/676 |
| 5,774,274 A | * | 6/1998 | Schachar | 359/676 |

(Continued)

FOREIGN PATENT DOCUMENTS

JP    06258502 A    *    9/1994

(Continued)

OTHER PUBLICATIONS

U.S. Appl. No. 10/819,308, filed Apr. 7, 2004, Wakai.

*Primary Examiner*—Evelyn A. Lester
(74) *Attorney, Agent, or Firm*—Pillsbury Winthrop Shaw Pittman LLP

(57) ABSTRACT

An optical apparatus uses a variable-optical-characteristic optical element whereby focusing, zooming or the like can be effected without moving a lens or the like and the whole optical apparatus can be arranged in a lightweight structure. The user wears a power transmitting unit 303 by hanging it from his/her neck, for example. The power transmitting unit 303 may be put in a clothes pocket or the like. The power transmitting unit 303 may be placed somewhere around the user. In the power transmitting unit 303, a transmitting circuit 305 is driven by a power supply 304 to send an electromagnetic wave from a transmitting antenna 306 toward variable-focus eyeglasses 302. The variable-focus eyeglasses 302 have a receiving antenna 307 provided on eyeglass frames 308 to receive the electromagnetic wave sent from the power transmitting unit 303. The received electromagnetic wave is, for example, boosted in voltage and rectified to drive the variable-focus lenses.

9 Claims, 30 Drawing Sheets

U.S. PATENT DOCUMENTS

| | | | |
|---|---|---|---|
| 5,915,063 A * | 6/1999 | Colbourne et al. | 385/140 |
| 5,917,657 A * | 6/1999 | Kaneko et al. | 359/661 |
| 6,038,080 A * | 3/2000 | Schachar | 359/666 |
| 6,055,090 A * | 4/2000 | Miles | 359/291 |
| 6,081,388 A * | 6/2000 | Widl | 359/666 |
| 6,317,108 B1 * | 11/2001 | Kalt | 345/85 |
| 6,438,282 B1 * | 8/2002 | Takeda et al. | 385/16 |
| 6,771,237 B1 * | 8/2004 | Kalt | 345/85 |
| 2003/0072070 A1 * | 4/2003 | Miles | 359/260 |
| 2003/0117719 A1 * | 6/2003 | Wakai et al. | 359/726 |
| 2004/0000843 A1 * | 1/2004 | East | 310/331 |

FOREIGN PATENT DOCUMENTS

| | | |
|---|---|---|
| JP | 11-317894 | 11/1999 |
| JP | 2000-267010 | 9/2000 |

* cited by examiner

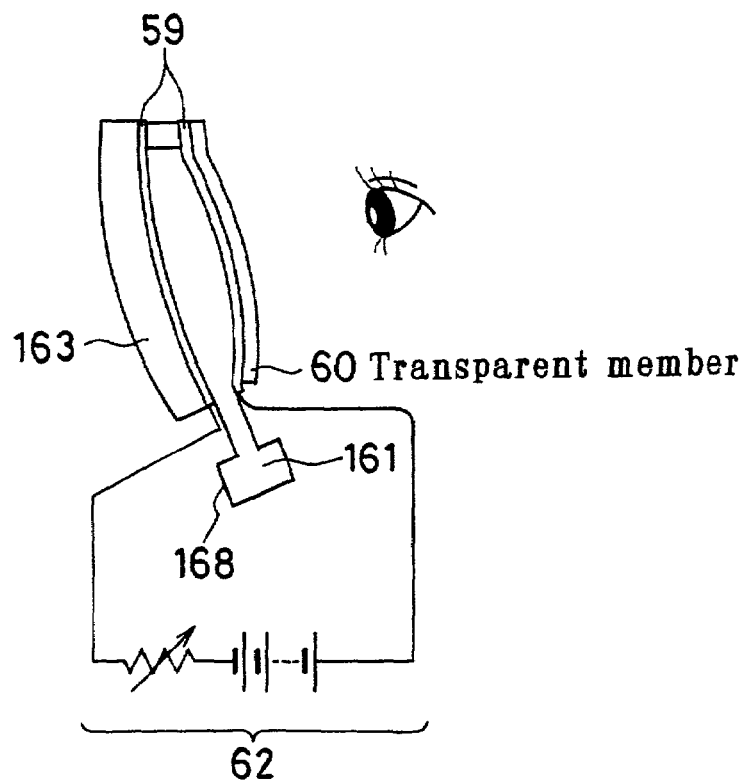
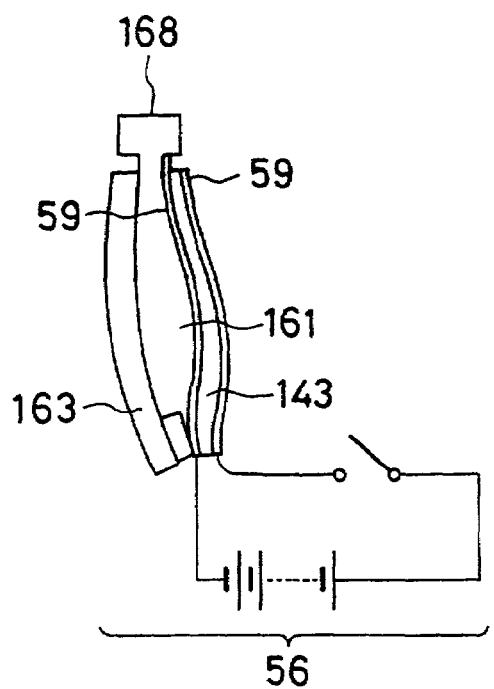

FIG. 18(a)
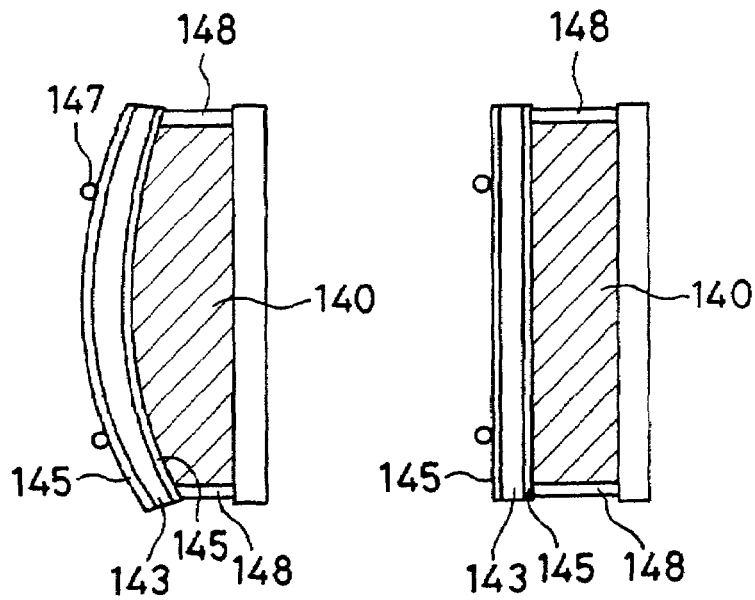
FIG. 18(b)
FIG. 19
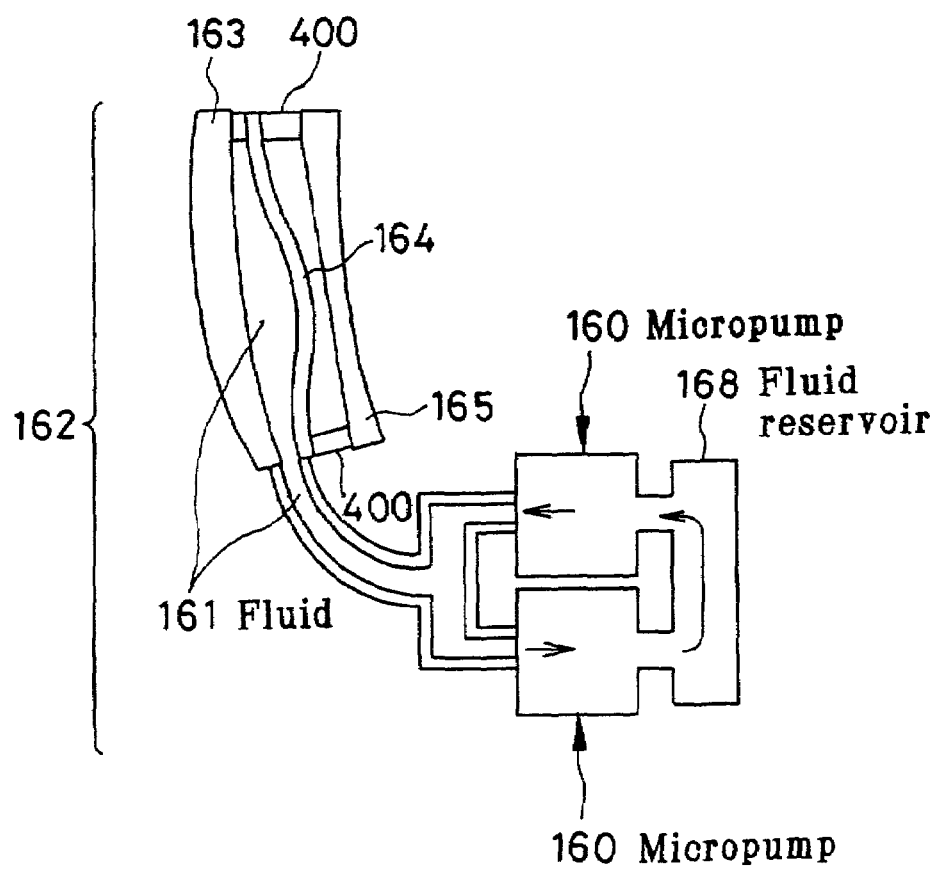

Trans form

Cis form

OPTICAL APPARATUS

This application claims benefit of Japanese Applications No. 2000-388165 filed in Japan on Dec. 21, 2000 and No. 2001-9951 filed in Japan on Jan. 18, 2001, the contents of which are incorporated by this reference.

BACKGROUND OF THE INVENTION

The present invention relates to optical apparatuses and, more particularly, to optical apparatuses using a variable-optical-characteristic optical element.

Conventionally, lenses, mirrors and so forth are used in optical apparatuses. These optical elements have invariable optical characteristics. That is, the focal length thereof, for example, is not variable. Therefore, in order to effect focusing or zooming, for example, it is necessary to move lenses, etc. This causes the whole optical apparatus to become unfavorably heavy in weight and large in size.

Conventional digital cameras have an arrangement in which an image display device, an imaging lens and a solid-state image pickup device are fixedly accommodated in a single box. Therefore, the conventional digital cameras have the disadvantage that they cannot be made compact and hence become unfavorably heavy. Further, because the definition (pixel density) of solid-state image pickup devices is becoming increasingly higher, the overall functions of digital cameras rapidly become obsolete. Meanwhile, there is a demand for a compact, lightweight and low-power consumption image pickup system for use in portable telephones, portable information terminals, capsule and other endoscopes, etc. In this regard, an image pickup system using the conventional method in which an optical system consisting of lenses and other optical elements is driven by a motor is large in size and heavy in weight and suffers unfavorably high power consumption.

SUMMARY OF THE INVENTION

The present invention was made in view of the above-described problems with the prior art.

Accordingly, an object of the present invention is to provide an optical apparatus using a variable-optical-characteristic optical element whereby focusing, zooming or the like can be effected without moving a lens or the like and the whole optical apparatus can be arranged in a lightweight structure.

Another object of the present invention is to provide optical apparatuses, e.g. digital cameras and systems using them, which are compact, lightweight and superior in function upgradeability and expandability.

For example, the optical apparatuses according to the present invention include the following:

[1] A variable-focus lens characterized by using a piezoelectric material.

[2] A variable mirror characterized by using a piezoelectric material.

[3] A variable-focus lens characterized by having a pump and a fluid.

[4] A variable mirror characterized by having a pump and a fluid.

[5] A variable-optical-characteristic optical element characterized by having a pump and a fluid.

[6] A variable mirror characterized by using at least two selected from the group consisting of electrostatic force, electromagnetic force, a piezoelectric effect, magnetostriction, a fluid pressure, a magnetic field, an electromagnetic wave, a temperature change, and a photomechanical effect.

[7] A variable-focus lens characterized by using at least two selected from the group consisting of electrostatic force, electromagnetic force, a piezoelectric effect, magnetostriction, a fluid pressure, a magnetic field, an electromagnetic wave, a temperature change, and a photomechanical effect.

[8] A variable-optical-characteristic optical element characterized by using at least two different driving methods.

[9] A variable-optical-characteristic optical element characterized by using at least two selected from the group consisting of electrostatic force, electromagnetic force, a piezoelectric effect, magnetostriction, a fluid pressure, a magnetic field, an electromagnetic wave, a temperature change, and a photomechanical effect.

[10] An optical device characterized by having at least two variable-optical-characteristic optical elements driven by a fluid or a jelly-like substance, wherein the variable-optical-characteristic optical elements are connected with each other so that the fluid or jelly-like substance is movable therebetween.

[11] An optical device as stated in the above paragraph 10, which is characterized in that the variable-optical-characteristic optical elements include a variable-focus lens.

[12] An optical device as stated in the above paragraph 10, which is characterized in that the variable-optical-characteristic optical elements include a variable-focus mirror.

[13] A variable-optical-characteristic optical element characterized by having a member for stepping up a voltage.

[14] A variable-optical-characteristic optical element as stated in the above paragraph 13, which is characterized by using electrostatic force or a piezoelectric effect.

[15] A variable-optical-characteristic optical element characterized by having a light quantity adjusting action effected by changing the light-deflecting characteristics of an optical surface.

[16] A variable-optical-characteristic optical element characterized by having a light quantity adjusting action effected by changing the light-deflecting characteristics of an optical surface to a considerable extent from a certain state where it is used.

[17] A variable-optical-characteristic optical element characterized by having a light quantity reducing action effected by changing the light-deflecting characteristics of an optical surface during the transfer operation of a solid-state image pickup device.

[18] A micropump characterized by using electrostatic force or a piezoelectric effect.

[19] A variable-optical-characteristic optical element characterized by having the micropump stated in the above paragraph 18.

[20] A variable mirror characterized in that a surface of an optical element facing the variable mirror has a curved surface configuration, and a transparent electrically conductive member is provided over the curved surface.

[21] A variable mirror characterized in that a surface of an optical element facing the variable mirror has a concave surface configuration, and a transparent electrically conductive member is provided over the concave surface.

[22] A variable mirror characterized in that a surface of an optical element facing the variable mirror has a convex surface configuration, and a transparent electrically conductive member is provided over the convex surface.

[23] A variable-optical-characteristic optical element characterized by using an organic material having piezoelectricity.

[24] A variable-optical-characteristic optical element characterized by using a synthetic resin material having piezoelectricity.

[25] A variable-focus lens characterized by using an organic material or a synthetic resin material and being sandwiched between transparent substrates.

[26] A variable-focus lens characterized by using an organic material having piezoelectricity or a synthetic resin material having piezoelectricity, wherein the variable-focus lens is sandwiched between transparent substrates.

[27] A variable-focus lens characterized by using an organic material or a synthetic resin material and being capable of changing the configuration thereof, wherein the variable-focus lens is sandwiched between transparent substrates.

[28] An image pickup apparatus characterized by having the variable-optical-characteristic optical element stated in any of the above paragraphs 15 to 17.

[29] A portable telephone characterized by having a variable-optical-characteristic optical element.

[30] A portable telephone characterized by having a variable mirror.

[31] A portable telephone characterized by having a variable-focus lens.

[32] A portable telephone characterized by having a magnification changing function.

[33] A portable telephone characterized by having a zooming function.

[34] A portable telephone characterized by having a focusing function.

[35] A portable telephone as stated in any of the above paragraphs 32 to 34, which is characterized by having a variable mirror.

[36] A portable telephone as stated in any of the above paragraphs 32 to 34, which is characterized by having a variable-focus lens.

[37] An image pickup apparatus or optical apparatus characterized by having a variable-optical-characteristic optical element, a free-form surface, and a twisted optical axis.

[38] An electronic image pickup apparatus characterized by having a lens, a variable-optical-characteristic optical element, a free-form surface, and a twisted optical axis.

[39] Variable-focus eyeglasses characterized by having variable-optical-characteristic optical elements.

[40] Variable-focus eyeglasses characterized by having variable-optical-characteristic optical elements using a piezoelectric material.

[41] Variable-focus eyeglasses characterized by having variable-optical-characteristic optical elements using a micropump.

[42] Variable-focus eyeglasses characterized by having variable-optical-characteristic optical elements using electrostatic force.

[43] Variable-focus eyeglasses characterized by having variable-optical-characteristic optical elements using electromagnetic force.

[44] Variable-focus eyeglasses characterized by having variable-optical-characteristic optical elements having a fluid or a jelly-like substance.

[45] Variable-focus eyeglasses characterized by having variable-optical-characteristic optical elements having a fluid or a jelly-like substance and transparent electrodes.

[46] An optical apparatus characterized by having a plurality of variable-optical-characteristic optical elements using different driving methods.

[47] An optical apparatus characterized by having a plurality of variable-optical-characteristic optical elements using different driving methods, wherein the variable-optical-characteristic optical elements are used for different functions.

[48] An optical apparatus characterized by having a plurality of variable mirrors using different driving methods.

[49] An optical apparatus characterized by having a plurality of variable-optical-characteristic optical elements using one selected from the group consisting of electrostatic force, electromagnetic force, a piezoelectric effect, magnetostriction, a fluid pressure, an electric field, a magnetic field, an electromagnetic wave, and a temperature change, wherein the variable-optical-characteristic optical elements are used for different functions.

[50] An image pickup apparatus adapted for being mounted on a vehicle, which is characterized by having a variable-optical-characteristic optical element.

[51] An optical system characterized in that a surface of an optical element facing a variable mirror has a concave surface configuration.

[52] An optical system characterized by having at least two optical elements having extended curved surfaces, and a variable-optical-characteristic optical element.

[53] An optical system characterized by having at least two optical elements having free-form surfaces, and a plurality of variable-optical-characteristic optical elements.

[54] A signal processing apparatus characterized by including a variable-optical-characteristic optical element.

[55] An information sending apparatus characterized by including a variable-optical-characteristic optical element.

[56] A remote controller characterized by including a variable-optical-characteristic optical element.

[57] A telephone characterized by including a variable-optical-characteristic optical element.

[58] A variable-optical-characteristic lens characterized in that a part of the lens is deformable by a piezoelectric effect.

[59] A variable-optical-characteristic lens characterized in that a part of a lens surface is deformable by a piezoelectric effect, and the lens does not have a reservoir for a fluid.

[60] A variable-optical-characteristic lens characterized by having a plurality of layers of a piezoelectric material.

[61] A variable-optical-characteristic optical element characterized by having a piezoelectric material consisting essentially of an organic material or a synthetic resin material or an elastomer.

[62] A variable-optical-characteristic lens characterized by having a piezoelectric material consisting essentially of an organic material or a synthetic resin material or an elastomer.

[63] A variable-optical-characteristic lens characterized by having a layer of a piezoelectric material consisting essentially of an organic material or a synthetic resin material or an elastomer, and a layer of a transparent member.

[64] A variable-optical-characteristic lens characterized by having a piezoelectric material consisting essentially of an organic material or a synthetic resin material or an elastomer, and a transparent member integrated with the piezoelectric material.

[65] A variable-optical-characteristic optical element characterized by using a magnetostrictive material.

[66] A variable-optical-characteristic mirror characterized by using a magnetostrictive material.

[67] A variable-optical-characteristic lens characterized by using a magnetostrictive material.

[68] A variable mirror characterized by using magnetic force.

[69] A variable mirror characterized by having a ferromagnetic material and using magnetic force.

[70] A variable-optical-characteristic optical element characterized by having a transparent member for protection.

[71] A variable-optical-characteristic optical element characterized by having a transparent member for protection in the vicinity of a surface on at least one side of a variable mirror or a variable-focus lens.

[72] A variable-optical-characteristic optical element characterized by using a photomechanical effect.

[73] A variable-focus lens characterized by using a photomechanical effect.

[74] A variable mirror characterized by using a photomechanical effect.

[75] A variable-optical-characteristic optical element characterized by having at least two different kinds of light sources and using a photomechanical effect.

[76] A contact lens characterized by using a variable-focus lens using a photomechanical effect.

[77] Variable-focus eyeglasses characterized in that a power supply is provided separately from variable-optical-characteristic optical elements.

[78] Variable-focus eyeglasses characterized in that electric power is supplied thereto by an electromagnetic wave.

[79] Variable-focus eyeglasses as stated in the above paragraph 78, which are characterized by having a transmitting antenna and a receiving antenna.

[80] Variable-focus eyeglasses as stated in the above paragraph 78, which are characterized by having a receiving antenna on an eyeglass frame.

[81] Variable-focus eyeglasses as stated in the above paragraph 77 or 78, which are characterized in that the power supply is placed somewhere around the user.

[82] Variable-focus eyeglasses as stated in the above paragraph 78, which are characterized in that an electromagnetic wave transmitted from a transmitting antenna is strong in a specific direction.

[83] Variable-focus eyeglasses as stated in the above paragraph 78, which are characterized by using a microwave.

[84] Variable-focus eyeglasses characterized by having a touch switch.

[85] Variable-focus eyeglasses characteristic by having a cyclic touch switch.

[86] Variable-focus eyeglasses characterized by having an angle sensor.

[87] Variable-focus eyeglasses characterized in that refractive power of the eyeglasses is varied in response to a signal from an angle sensor.

[88] An optical system characterized by having a variable-optical-characteristic optical element for focusing, wherein zooming or a magnification change is effected by moving an optical element.

[89] An optical system characterized by having a variable mirror for focusing, wherein zooming or a magnification change is effected by moving an optical element.

[90] An optical system characterized by having a variable-focus lens for focusing, wherein zooming or a magnification change is effected by moving an optical element.

[91] An optical system characterized by using a variable mirror in which the short-side direction of an image pickup area is approximately parallel to the light-beam incidence plane of the variable mirror.

[92] An optical system characterized by using a variable mirror in which the short-side direction of an image pickup area is 40° or less with respect to the light-beam incidence plane of the variable mirror.

[93] A method of controlling a variable-optical-characteristic optical element, which is characterized in that the amount of change of the variable-optical-characteristic optical element is determined by referring to values previously recorded in a storage device in accordance with the object distance, field angle, etc.

[94] A method of controlling a variable mirror, which is characterized in that the amount of deformation of the variable mirror is determined by referring to values previously recorded in a storage device in accordance with the object distance, field angle, etc.

[95] A method of controlling a variable-focus lens, which is characterized in that the amount of change of the variable-focus lens is determined by referring to values previously recorded in a storage device in accordance with the object distance, field angle, etc.

[96] A remote controller characterized by having a variable-optical-characteristic optical element.

[97] A cordless remote controller characterized by having a variable-optical-characteristic optical element.

[98] An automobile characterized by having a variable-optical-characteristic optical element.

[99] A viewfinder characterized by having a variable-optical-characteristic optical element.

[100] A viewfinder type display apparatus characterized by having a variable-optical-characteristic optical element.

[101] A viewfinder or viewfinder type display apparatus as stated in the above paragraph 99 or 100, which is characterized by having a zooming function.

[102] A display apparatus characterized by using a variable-optical-characteristic optical element.

[103] A video projector characterized by using a variable-optical-characteristic optical element.

[104] A signal processing apparatus characterized by using a variable-optical-characteristic optical element.

[105] A viewing apparatus characterized by using a variable-optical-characteristic optical element.

[106] A variable mirror characterized in that a surface of an optical element facing the variable mirror has a curved surface configuration.

[107] A variable mirror characterized in that a surface of an optical element facing the variable mirror has a concave surface configuration.

[108] A variable mirror characterized in that a surface of an optical element facing the variable mirror has a convex surface configuration.

[109] An optical apparatus characterized in that a space facing a variable-optical-characteristic optical element is closed with a transparent member and a mechanical member.

[110] An optical apparatus characterized in that a space facing a variable-optical-characteristic optical element is hermetically sealed with a transparent member and a mechanical member.

[111] An optical apparatus as stated in the above paragraph 109, which is characterized by using an air-permeable mechanical member or transparent member.

[112] An optical apparatus as stated in any of the above paragraphs 109 to 111, which is characterized in that the variable-optical-characteristic optical element is a variable mirror.

[113] An optical apparatus as stated in any of the above paragraphs 109 to 111, which is characterized in that the variable-optical-characteristic optical element is a variable-focus lens or prism.

[114] Variable-focus eyeglasses characterized having a receiving antenna on an eyeglass lens, wherein electric power is supplied by an electromagnetic wave.

[115] An optical apparatus characterized by having a variable-optical-characteristic optical element.

[116] An optical apparatus characterized by having a variable-optical-characteristic optical element to effect focusing, a magnification change or a change in the viewing direction.

[117] An image pickup apparatus adapted for being mounted on a vehicle, which is characterized by having the optical apparatus stated in the above paragraph 116.

[118] A variable mirror characterized by using an organic piezoelectric material or a synthetic resin material having piezoelectricity.

[119] A variable-optical-characteristic optical element characterized by having a light quantity adjusting action effected by changing the configuration of an optical surface to a considerable extent from a certain state where it is used.

[120] An image pickup apparatus characterized by having the optical element stated in the above paragraph 119.

[121] An optical apparatus characterized by having a plurality of variable-optical-characteristic optical elements using different driving methods, wherein the variable-optical-characteristic optical elements are used at different speeds of response.

[122] An optical system characterized by having at least two optical elements having free-form surfaces, and a variable-optical-characteristic optical element.

[123] A variable-optical-characteristic optical element characterized by requiring electric power for operating.

[124] An electronic image pickup system including: an electronic image pickup apparatus capable of taking an image alone; and a casing having a display apparatus, which is connectable with the electronic image pickup apparatus.

[125] A variable-optical-characteristic optical element using at least two selected from the group consisting of electrostatic force, electromagnetic force, a piezoelectric effect, a fluid pressure, an electric field, a magnetic field, an electromagnetic wave, and a temperature change.

[126] A portable telephone having a variable-optical-characteristic optical element.

[127] An electronic image pickup system as stated in the above paragraph 124, which is capable of taking an image even when the casing and the electronic image pickup apparatus are connected with each other.

[128] An electronic image pickup system including: an electronic image pickup apparatus capable of taking an image alone, which is not provided with a display apparatus; and a casing having a display apparatus, which is connectable with the electronic image pickup apparatus.

[129] An electronic image pickup system including: an electronic image pickup apparatus capable of taking an image alone; and a casing having a display apparatus, which can be integrated with the electronic image pickup apparatus.

[130] An electronic image pickup system including: a card-type electronic image pickup apparatus capable of taking an image alone; and a casing having a display apparatus, which is connectable with the electronic image pickup apparatus.

[131] An electronic image pickup system including: a card-type electronic image pickup apparatus capable of taking an image alone; and a casing having a display apparatus, which can be integrated with the electronic image pickup apparatus.

[132] An electronic image pickup system including: a card-type electronic image pickup apparatus capable of taking an image alone, which is not provided with a display apparatus; and a casing having a display apparatus, which is connectable with the electronic image pickup apparatus.

[133] An electronic image pickup system including: a box-type electronic image pickup apparatus capable of taking an image alone; and a box having a display apparatus, which is connectable with the electronic image pickup apparatus.

[134] An electronic image pickup system including: a box-type electronic image pickup apparatus capable of taking an image alone, which is not provided with a display apparatus; and a box having a display apparatus, which is connectable with the electronic image pickup apparatus.

[135] An electronic image pickup apparatus connectable with a casing having a display apparatus and capable of taking an image either alone or in the state of being connected with the casing.

[136] A casing having a display apparatus, which is connectable with an electronic image pickup apparatus capable of taking an image either alone or in the state of being connected with the casing.

[137] An electronic image pickup apparatus connectable with a box having a display apparatus and capable of taking an image either alone or in the state of being connected with the box.

[138] A box having a display apparatus, which is connectable with an electronic image pickup apparatus capable of taking an image either alone or in the state of being connected with the box.

[139] A card or casing having the function of each card or each casing shown in FIG. 48.

[140] A box A or box B having the function of each card or each casing shown in FIG. 48.

[141] A variable-focus lens using a piezoelectric material.

[142] A variable mirror using a piezoelectric material.

[143] A variable-focus lens having a pump and a fluid.

[144] A variable mirror having a pump and a fluid.

[145] A variable-optical-characteristic optical element having a pump and a fluid.

[146] A variable mirror using at least two selected from the group consisting of electrostatic force, electromagnetic force, a piezoelectric effect, a fluid pressure, an electric field, a magnetic field, an electromagnetic wave, and a temperature change.

[147] A variable-focus lens using at least two selected from the group consisting of electrostatic force, electromagnetic force, a piezoelectric effect, a fluid pressure, an electric field, a magnetic field, an electromagnetic wave, and a temperature change.

[148] A variable-optical-characteristic optical element using at least two different driving methods.

[149] An optical device characterized by having at least two variable-optical-characteristic optical elements driven by a fluid or a jelly-like substance, wherein the optical elements are connected with each other so that the fluid or jelly-like substance is movable therebetween.

[150] An optical device as stated in the above paragraph 149, wherein the variable-optical-characteristic optical elements include a variable-focus lens.

[151] An optical device as stated in the above paragraph 149, wherein the variable-optical-characteristic optical elements include a variable-focus mirror.

[152] A variable-optical-characteristic optical element having a member for stepping up a voltage.

[153] A variable-optical-characteristic optical element as stated in the above paragraph 152, which uses electrostatic force or a piezoelectric effect.

[154] A variable-optical-characteristic optical element having a light quantity adjusting action effected by changing the light-deflecting characteristics of an optical surface.

[155] A variable-optical-characteristic optical element having a light quantity adjusting action effected by changing the light-deflecting characteristics of an optical surface to a considerable extent from a certain state where it is used.

[156] A variable-optical-characteristic optical element having a light quantity adjusting action effected by changing the configuration of an optical surface to a considerable extent from a certain state where it is used.

[157] A variable-optical-characteristic optical element having a light quantity reducing action effected by changing the light-deflecting characteristics of an optical surface during the transfer operation of a solid-state image pickup device.

[158] A micropump using electrostatic force or a piezoelectric effect.

[159] A variable-optical-characteristic optical element having the micropump stated in the above paragraph 158.

[160] A variable mirror wherein a surface of an optical element facing the variable mirror has a curved surface configuration, and a transparent electrically conductive member is provided over the curved surface.

[161] A variable mirror wherein a surface of an optical element facing the variable mirror has a concave surface configuration, and a transparent electrically conductive member is provided over the concave surface.

[162] A variable mirror wherein a surface of an optical element facing the variable mirror has a convex surface configuration, and a transparent electrically conductive member is provided over the convex surface.

[163] A variable-optical-characteristic optical element using an organic material having piezoelectricity.

[164] A variable-optical-characteristic optical element using a synthetic resin material having piezoelectricity.

[165] A variable-focus lens using an organic material or a synthetic resin material and being sandwiched between transparent substrates.

[166] A variable-focus lens using an organic material having piezoelectricity or a synthetic resin material having piezoelectricity, wherein the variable-focus lens is sandwiched between transparent substrates.

[167] A variable-focus lens using an organic material or a synthetic resin material and being capable of changing the configuration thereof, wherein the variable-focus lens is sandwiched between transparent substrates.

[168] An optical apparatus having a variable-optical-characteristic optical element.

[169] An image pickup apparatus having the variable-optical-characteristic optical element stated in one of the above paragraphs 154 to 157.

[170] A portable telephone having a variable mirror.

[171] A portable telephone having a variable-focus lens.

[172] A portable telephone having a magnification changing function.

[173] A portable telephone having a zooming function.

[174] A portable telephone having a focusing function.

[175] A portable telephone as stated in the above paragraphs 172 to 174, which has a variable mirror.

[176] A portable telephone as stated in the above paragraphs 172 to 174, which has a variable-focus lens.

[177] An image pickup apparatus or optical system having a variable-optical-characteristic optical element, a free-form surface, and a twisted optical axis.

[178] An electronic image pickup apparatus or optical apparatus having a lens, a variable-optical-characteristic optical element, a free-form surface, and a twisted optical axis.

[179] Variable-focus eyeglasses having variable-optical-characteristic optical elements.

[180] Variable-focus eyeglasses having variable-optical-characteristic optical elements using a piezoelectric material.

[181] Variable-focus eyeglasses having variable-optical-characteristic optical elements using a micropump.

[182] Variable-focus eyeglasses having variable-optical-characteristic optical elements using electrostatic force.

[183] Variable-focus eyeglasses having variable-optical-characteristic optical elements using electromagnetic force.

[184] Variable-focus eyeglasses having variable-optical-characteristic optical elements having a fluid or a jelly-like substance.

[185] Variable-focus eyeglasses having variable-optical-characteristic optical elements having a fluid or a jelly-like substance and transparent electrodes.

[186] An optical apparatus having a plurality of variable-optical-characteristic optical elements using different driving methods.

[187] An optical apparatus having a plurality of variable-optical-characteristic optical elements using different driving methods, wherein the variable-optical-characteristic optical elements are used for different functions.

[188] An optical apparatus having a plurality of variable-optical-characteristic optical elements using different driving methods, wherein the variable-optical-characteristic optical elements are used at different speeds of response.

[189] An optical apparatus having a plurality of variable mirrors using different driving methods.

[190] An optical apparatus having a plurality of variable-optical-characteristic optical elements using one selected from the group consisting of electrostatic force, electromagnetic force, a piezoelectric effect, magnetostriction, a fluid pressure, an electric field, a magnetic field, an electromagnetic wave, and a temperature change, wherein the variable-optical-characteristic optical elements are used for different functions.

[191] An image pickup apparatus adapted for being mounted on a vehicle, which has a variable-optical-characteristic optical element.

[192] An image pickup apparatus adapted for being mounted on a vehicle, which has a variable-focus mirror to effect focusing, zooming or a change in the viewing direction.

[193] An optical apparatus wherein a surface of an optical element facing a variable mirror has a concave surface configuration.

[194] An optical system having at least two optical elements having extended curved surfaces, and a variable-optical-characteristic optical element.

[195] An optical apparatus having at least two optical elements having free-form surfaces, and a variable-optical-characteristic optical element.

[196] An optical apparatus having at least two optical elements having free-form surfaces, and a plurality of variable-optical-characteristic optical elements.

[197] A display apparatus using a variable-optical-characteristic optical element.

[198] A video projector using a variable-optical-characteristic optical element.

[199] A signal processing apparatus using a variable-optical-characteristic optical element.

[200] A viewing apparatus using a variable-optical-characteristic optical element.

[201] A signal processing apparatus including a variable-optical-characteristic optical element.

[202] An information sending apparatus including a variable-optical-characteristic optical element.

[203] A remote controller including a variable-optical-characteristic optical element.

[204] A telephone including a variable-optical-characteristic element.

[205] A variable-optical-characteristic optical element wherein a transparent member for protection is provided at at least one side of the variable-optical-characteristic optical element.

[206] A variable mirror using an organic piezoelectric material or a synthetic resin material having piezoelectricity.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is a diagram for describing the arrangement and operation of an example of a variable-focus lens for use in an optical product according to the present invention, which uses electrostatic force.

FIG. 2 is a diagram for describing the arrangement and operation of an example of a variable-focus lens for use in an optical product according to the present invention, which uses a transparent piezoelectric resin material.

FIG. 18 is a diagram for describing the arrangement and operation of an embodiment of a variable-focus lens having the same arrangement as that shown in FIG. 17 except that the cylinder is omitted.

FIG. 19 is a diagram showing the arrangement of an embodiment of a variable-focus lens according to the present invention in which a fluid is forced in and out by a micropump.

DESCRIPTION OF THE PREFERRED EMBODIMENTS

Figure 3:
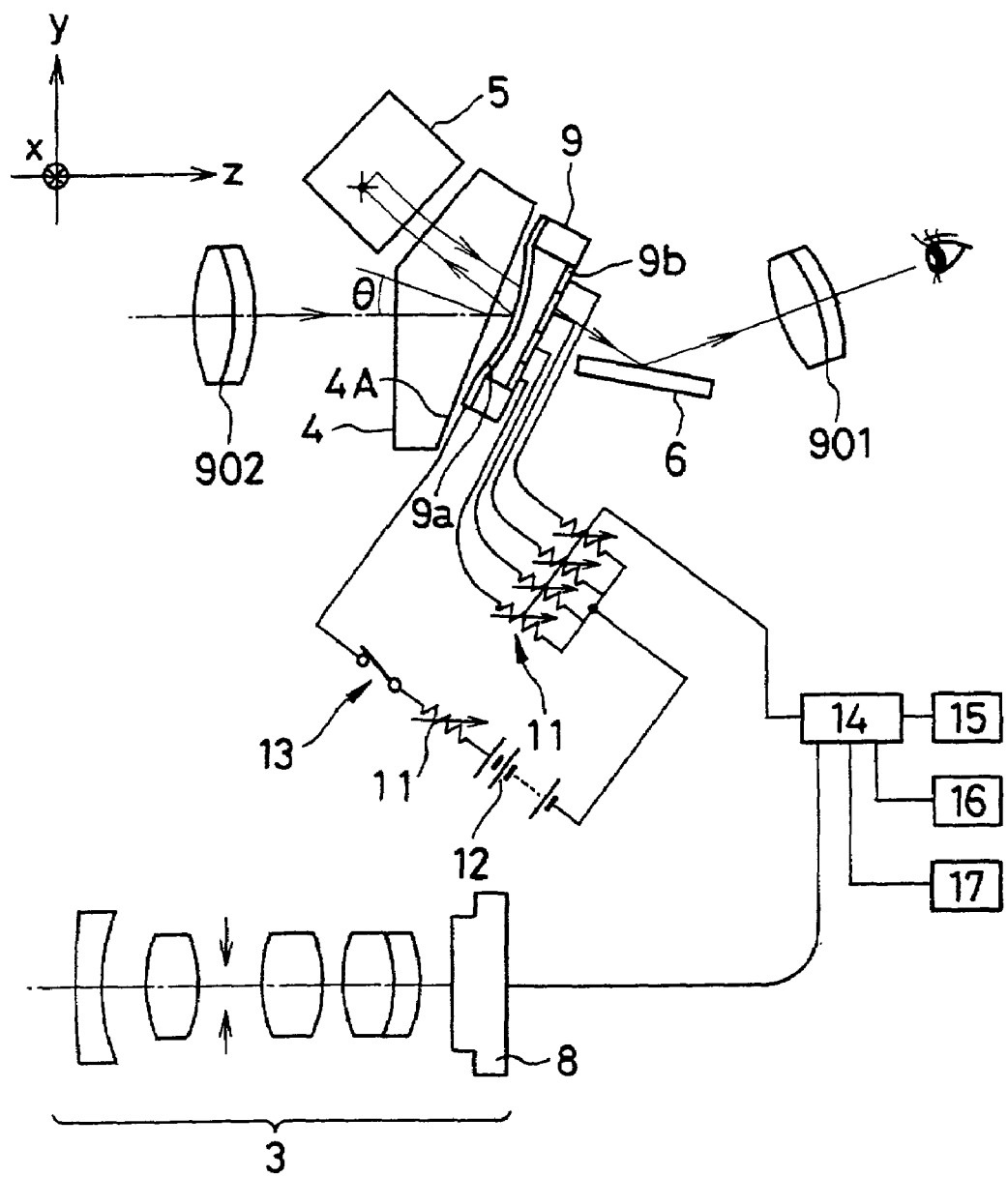
FIG. 3 is a diagram showing the arrangement of an example of the optical apparatus according to the present invention.

Embodiments of the optical apparatus according to the present invention will be described below.

FIG. 1 is a diagram for describing the arrangement and operation of an example of a variable-focus lens 62 for use in an optical product according to the present invention, which uses electrostatic force. A transparent member 60 is deformable under application of a voltage. The deformation of the transparent member 60 causes a change in the configuration of the lens, thereby allowing a variable-focus system to be realized. In FIG. 1, reference numeral 59 denotes transparent electrodes, and reference numeral 161 denotes a transparent fluid. Further, reference numeral 163 denotes a transparent substrate, and reference numeral 168 denotes a fluid reservoir. The transparent substrate 163 and the transparent member 60 are positioned to face each other. The transparent electrodes 59 are provided on the respective inner sides of the transparent substrate 163 and the transparent member 60. The space between the transparent electrodes 59 is filled with the transparent fluid 161 from the fluid reservoir 168. The transparent member 60 is deformed by varying the voltage applied between the transparent electrodes 59, thereby allowing the lens configuration to be changed.

FIG. 2 is a diagram for describing the arrangement and operation of an example of a variable-focus lens 56 for use in an optical product according to the present invention, which uses a transparent piezoelectric resin material. Transparent electrodes 59 are cemented to both sides of a soft transparent substance 143 having piezoelectricity. When a voltage is applied between the transparent electrodes 59, the transparent substance 143 is deformed by the piezoelectric effect, thereby allowing a variable-focus system to be realized. Thus, the transparent substance 143 is deformed by varying the voltage applied between the transparent electrodes 59, thereby allowing the lens configuration to be changed.

In the case of FIG. 1, the configuration of the variable-focus lens 62 is changed by using electrostatic force. However, electromagnetic force may be used in place of electrostatic force. In this regard, a reference should be made to the following examples of variable mirrors.

Next, variable mirrors will be described.

FIG. 3 is a diagram showing the arrangement of an example of the optical apparatus according to the present invention. The figure shows an example of a Keplerian viewfinder for a digital camera that uses a variable-optical-characteristic mirror 9. It is a matter of course that the illustrated optical apparatus is also usable in a silver halide film-with-lens camera. First, the variable-optical-characteristic mirror 9 will be described.

The variable-optical-characteristic mirror (hereinafter referred to as simply "variable mirror") 9 comprises an aluminum-coated thin film (reflecting surface) 9a and a plurality of electrodes 9b. A plurality of variable resistors 11 are connected to the electrodes 9b, respectively. A power supply 12 is connected between the thin film 9a and the electrodes 9b through the variable resistors 11 and a power switch 13. A computing unit 14 controls the resistance values of the variable resistors 11. A temperature sensor 15, a humidity sensor 16 and a distance sensor 17 are connected to the computing unit 14. These members are arranged as shown in the figure to constitute one optical apparatus.

It should be noted that each of the surfaces of an objective lens 902, ocular lens 901, prism 4, isosceles rectangular prism 5, mirror 6 and variable mirror 9 need not be plane surfaces but may have any configuration, e.g. a spherical surface, a rotationally symmetric aspherical surface, a spherical surface decentered with respect to an optical axis, a plane surface decentered with respect to an optical axis, a rotationally symmetric aspherical surface decentered with respect to an optical axis, an aspherical surface having planes of symmetry, an aspherical surface having only one plane of symmetry, an aspherical surface having no plane of symmetry, a free-form surface, or a surface having non-differentiable points or lines. The surfaces may be any surfaces that can have some effect on light, whether reflecting surfaces or refracting surfaces. These surfaces will hereinafter be generically called "extended curved surfaces".

The thin film 9a is adapted to be deformed by electrostatic force when a voltage is applied between the plurality of electrodes 9b so that the surface configuration thereof is changed as in the case of membrane mirrors described, for example, in Handbook of Microlithography, Micromachining and Microfabrication, Volume 2: Micromachining and Microfabrication, P. 495, FIG. 8.58, compiled by P. Raichoudhury, SPIE PRESS, and Optics Communications, Vol. 140 (1997), p. 187-190. Thus, it is possible to effect focusing in accordance with the diopter of the observer. In addition, the thin film 9a suppresses degradation in image-forming performance caused by deformation or variations in refractive index of the lenses 901 and 902 and/or the prism 4, the isosceles rectangular prism 5 and the mirror 6 or expansion, contraction or deformation of the lens frames due to changes in temperature and humidity and assembling errors of components such as optical elements and frames, thereby making it possible to effect focusing correctly and to correct aberrations arising from the focusing at all times.

Figure 5:
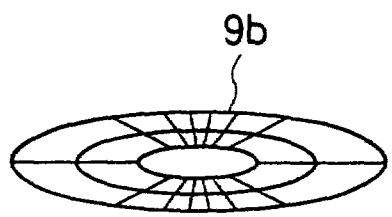
FIG. 5 is a diagram showing an arrangement in which electrodes are divided concentrically.
Figure 6:
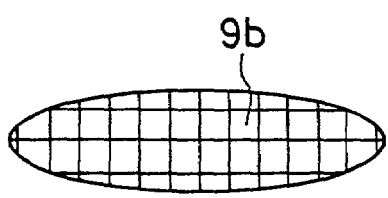
FIG. 6 is a diagram showing an arrangement in which electrodes are divided rectangularly.

Regarding the configuration of the electrodes 9b, any appropriate configuration should be selected in accordance with the way in which the thin film 9a is deformed, as shown in FIG. 5 or 6 by way of example.

According to this embodiment, light from an object is refracted by the entrance and exit surfaces of the objective lens 902 and the prism 4 and reflected by the variable mirror 9. The reflected light passes through the prism 4 and is reflected by the isosceles rectangular prism 5 (in FIG. 3, the mark + in the optical path indicates that light rays travel toward the reverse side of the plane of the figure). The reflected light is further reflected by the mirror 6 to enter the eye through the ocular lens 901. Thus, the lenses 901 and 902, the prisms 4 and 5, and the variable mirror 9 constitute a viewing optical system of the optical apparatus according to this embodiment. By optimizing the surface configurations and thicknesses of these optical elements, it is possible to minimize aberrations of the object image.

That is, the configuration of the thin film 9a, which serves as a reflecting surface, is controlled by changing the resistance value of each variable resistor 11 on the basis of a signal from the computing unit 14 so that the image-forming performance is optimized. More specifically, the computing unit 14 is supplied with input signals having magnitudes corresponding to the ambient temperature and humidity and the distance to the object from the temperature sensor 15, the humidity sensor 16 and the distance sensor 17. On the basis of these input signals, the computing unit 14 outputs a signal for determining the resistance values of the variable resistors 11 so that such a voltage is applied to each of the electrodes 9b that the configuration of the thin film 9a is determined so as to compensate for degradation in image-forming performance due to the ambient temperature and humidity conditions and the distance to the object. Thus, the thin film 9a is deformed by the voltage applied to each of the electrodes 9b, that is, electrostatic force. Therefore, the thin film 9a assumes various configurations, including an aspherical surface, according to circumstances. If the polarity of the applied voltage is changed, the thin film 9a can be deformed into a convex surface. It should be noted that the distance sensor 17 may be omitted. In such a case, an imaging lens 3 of the digital camera is moved so that the high-frequency component of the image signal from a solid-state image pickup device 8 substantially reaches a maximum. From this position, the object distance is calculated in reverse manner, and the variable mirror is deformed so that focusing is effected with respect to the observer's eye.

If the thin film 9a is produced from a synthetic resin material, e.g. a polyimide, the thin film 9a can be deformed to a considerable extent with a low voltage, advantageously. It should be noted that the prism 4 and the variable mirror 9 can be integrally formed into one unit, and this unit is an example of the optical apparatus according to the present invention.

Although not shown in the figure, the solid-state image pickup device 8 may be integrally formed on the substrate of the variable mirror 9 by a lithography process.

If the lenses 901 and 902, the prisms 4 and 5, and the mirror 6 are formed by plastic molding or the like, curved surfaces of desired configurations can be readily formed at will, and the production is facilitated. Although in the image pickup apparatus according to this embodiment the lenses 901 and 902 are formed away from the prism 4, if the prisms 4 and 5, the mirror 6 and the variable mirror 9 are designed so that aberrations can be removed without providing the lenses 901 and 902, the prisms 4 and 5 and the variable mirror 9 are constructed in the form of a single optical block. Accordingly, the assembly is facilitated. Some or all of the optical elements, i.e. the lenses 901 and 902, the prisms 4 and 5, and the mirror 6, may be made of glass. By doing so, an image pickup apparatus with a higher degree of accuracy can be obtained.

In the example shown in FIG. 3, the computing unit 14, the temperature sensor 15, the humidity sensor 16 and the distance sensor 17 are provided, and temperature and humidity changes and a change in the object distance are compensated for by the variable mirror 9. However, the present invention is not necessarily limited thereto. That is, the arrangement may be such that the computing unit 14, the temperature sensor 15, the humidity sensor 16 and the distance sensor 17 are omitted, and only a change in the diopter of the observer is compensated for by the variable mirror 9.

Next, the arrangement of the variable mirror 9 will be described.

Figure 4:
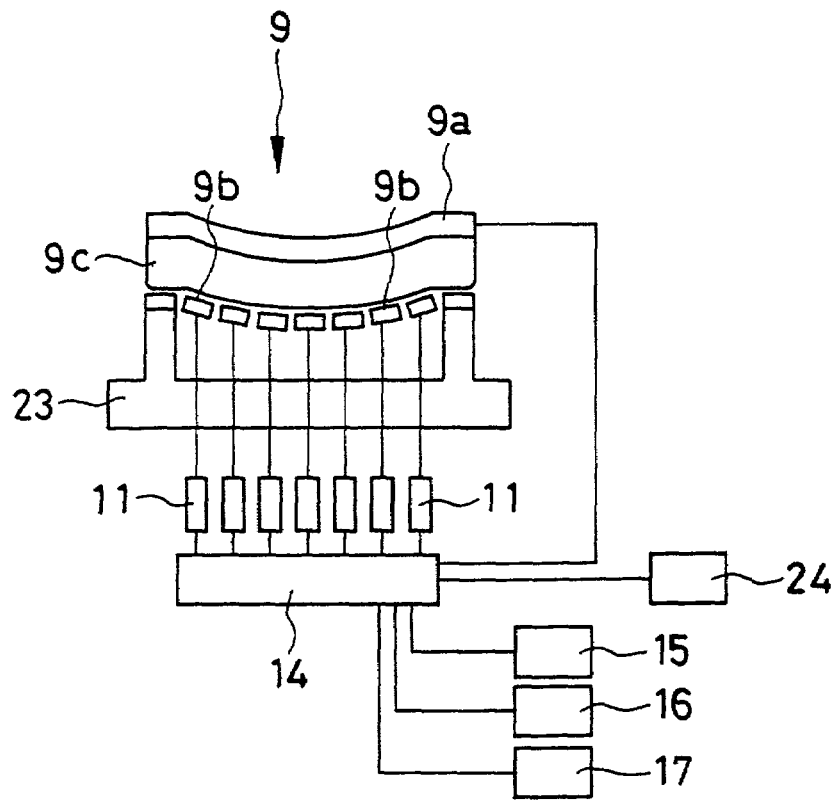
FIG. 4 is a diagram showing another embodiment of the variable mirror shown in FIG. 3.

FIG. 4 shows another embodiment of the variable mirror 9. In this embodiment, a piezoelectric element 9c is interposed between the thin film 9a and the electrodes 9b, and these members are provided on a support plate 23. By changing the voltage applied to the piezoelectric element 9c for each electrode 9b, the piezoelectric element 9c is caused to have expansion or contraction varying from region to region, thereby allowing the configuration of the thin film 9a to be changed. Regarding the configuration of the electrodes 9b, the electrodes 9b may be concentrically divided as shown in FIG. 5 or rectangularly divided as shown in FIG. 6. In addition, it is possible to select any appropriate configuration. Reference numeral 24 denotes a shake (blur) sensor connected to the computing unit 14. The shake sensor 24 senses a shake at the time of photographing with a digital camera, for example, and causes the voltage applied to the electrodes 9b to be changed through the computing unit 14 and the variable resistors 11 to deform the thin film 9a so as to compensate for disorder of the image due to the shake. At this time, signals from the temperature sensor 15, the humidity sensor 16 and the distance sensor 17 are also simultaneously taken into consideration, and thus focusing, temperature and humidity compensation, etc. are performed. In this case, the thin film 9a is subjected to stress accompanying the deformation of the piezoelectric element 9c. Therefore, the thin film 9a should preferably be made thick to a certain extent so as to have appropriate strength.

Figure 7:
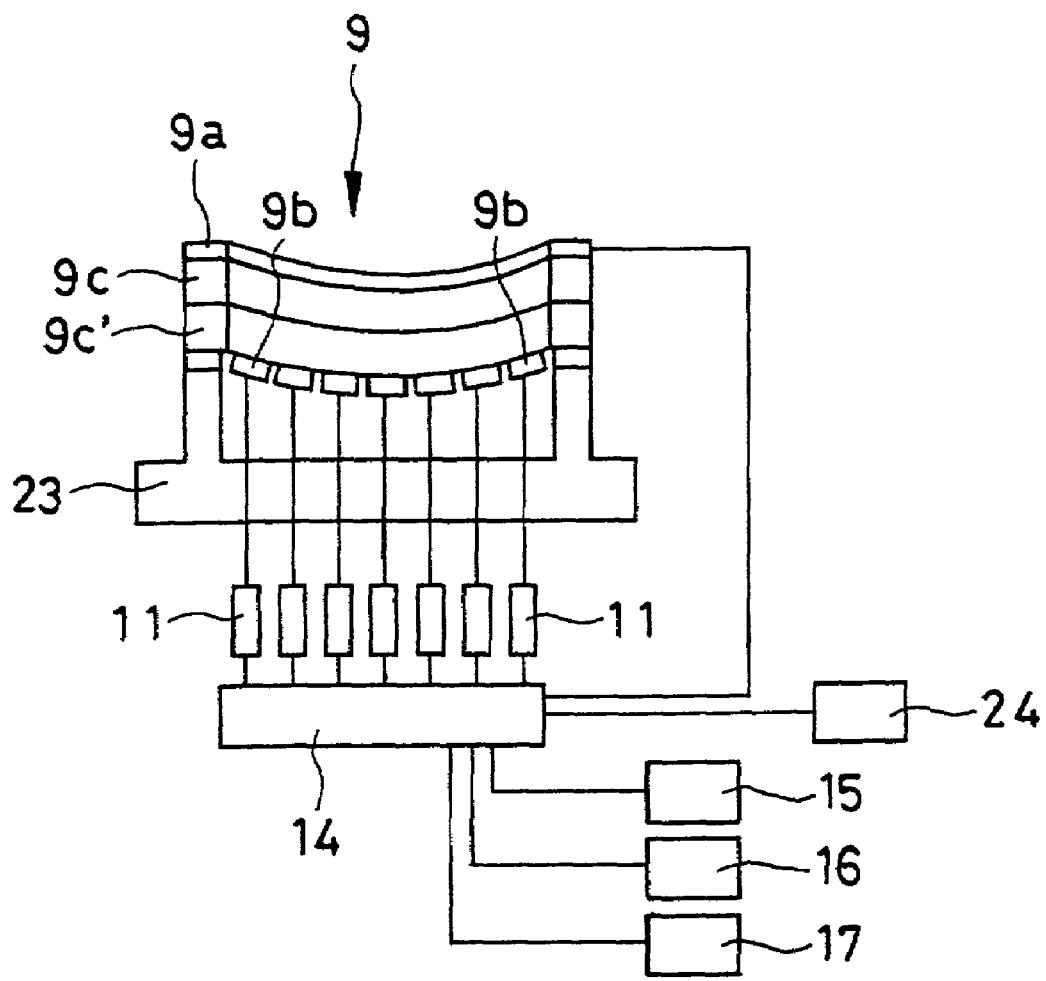
FIG. 7 is a diagram showing a further embodiment of the variable mirror.

FIG. 7 shows a further embodiment of the variable mirror 9. This embodiment differs from the embodiment shown in FIG. 4 in that a piezoelectric element interposed between the thin film 9a and the electrodes 9b comprises two piezoelectric elements 9c and 9c' made of respective materials having piezoelectric characteristics opposite in direction to each other. That is, if the piezoelectric elements 9c and 9c' are made of ferroelectric crystals, the crystals are disposed so that the directions of the crystal axes are opposite to each other. In this case, when a voltage is applied thereto, the piezoelectric elements 9c and 9c' expand or contract in opposite directions. Therefore, force for deforming the thin film 9a is stronger than in the case of the example shown in FIG. 4. Consequently, the configuration of the mirror surface can be changed to a considerable extent, advantageously.

Examples of materials usable for the piezoelectric elements 9c and 9c' include piezoelectric substances, i.e. barium titanate, Rochelle salt, rock crystal, tourmaline, potassium dihydrogenphosphate (KDP), ammonium dihydrogenphosphate (ADP), and lithium niobate, polycrystals of the piezoelectric substances, crystals of the piezoelectric substances, piezoelectric ceramics comprising a solid solution of $PbZrO_3$ and $PbTiO_3$ organic piezoelectric substances, i.e. polyvinyl difluoride (PVDF), and other ferroelectric materials. Organic piezoelectric substances are particularly preferable because they have a small Young's modulus and are deformable to a considerable extent with a low voltage. It should be noted that when these piezoelectric elements are used, if the thickness thereof is made non-uniform, the configuration of the thin film 9a can be changed appropriately in the above-described embodiment.

Figure 8:
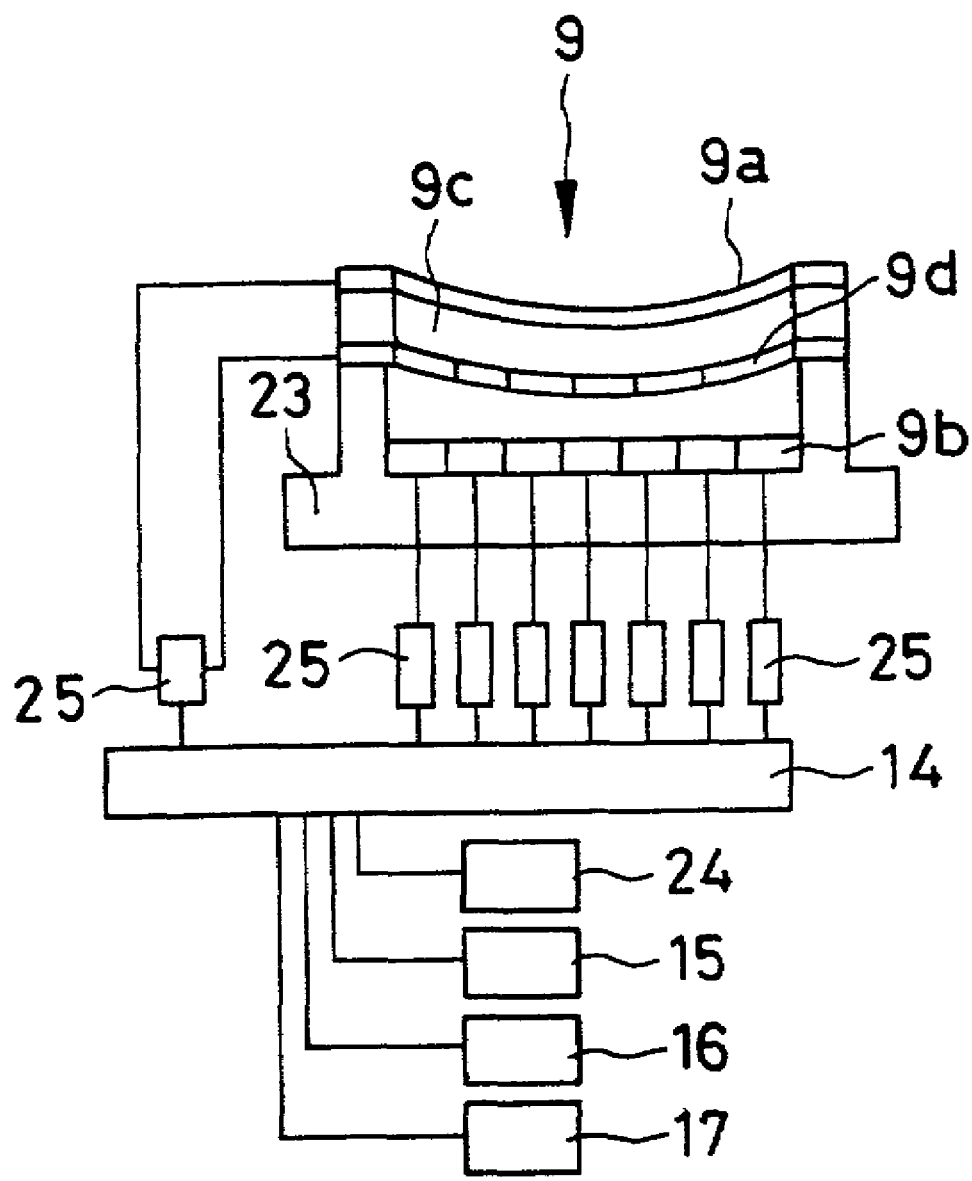
FIG. 8 is a diagram showing a further embodiment of the variable mirror.

FIG. 8 shows a further embodiment of the variable mirror 9. In this embodiment, the piezoelectric element 9c is sandwiched between the thin film 9a and an electrode 9d, and a voltage is applied between the thin film 9a and the electrode 9d through a driving circuit 25 controlled by the computing unit 14. In addition to this, a voltage is applied to each of the electrodes 9b provided on the support plate 23 through each driving circuit 25 controlled by the computing unit 14. Accordingly, in this embodiment the thin film 9a can be deformed double by the piezoelectric effect produced by the voltage applied between it and the electrode 9d and electrostatic force produced by the voltage applied to each electrode 9b. Thus, the thin film 9a can provide a larger number of deformation patterns and exhibit faster response than any of those shown in the foregoing embodiments, advantageously.

If the sign of the voltage applied between the thin film 9a and the electrode 9d is changed, the variable mirror can be deformed into either a convex surface or a concave surface. The arrangement may be such that a large deformation is made by the piezoelectric effect, and a small configuration change is effected by the electrostatic force. It is also possible to use the piezoelectric effect mainly for the deformation of the variable mirror into a convex surface and to use the electrostatic force mainly for the deformation of the variable mirror into a concave surface.

It should be noted that the electrode 9d may be formed from a plurality of electrodes as in the case of the electrodes 9b. The way in which the electrode 9d comprises a plurality of electrodes is shown in FIG. 8. It should be noted that, in this specification, piezoelectric effect, electrostriction and electrostrictive effect are generically called "piezoelectric effect". Accordingly, electrostrictive materials shall also be included in piezoelectric materials.

In a case where an electrostrictive material is used as the piezoelectric element 9c, it is possible to form the piezoelectric element 9c in a structure in which the electrostrictive material and a deformable substrate are integrated together.

Figure 9:
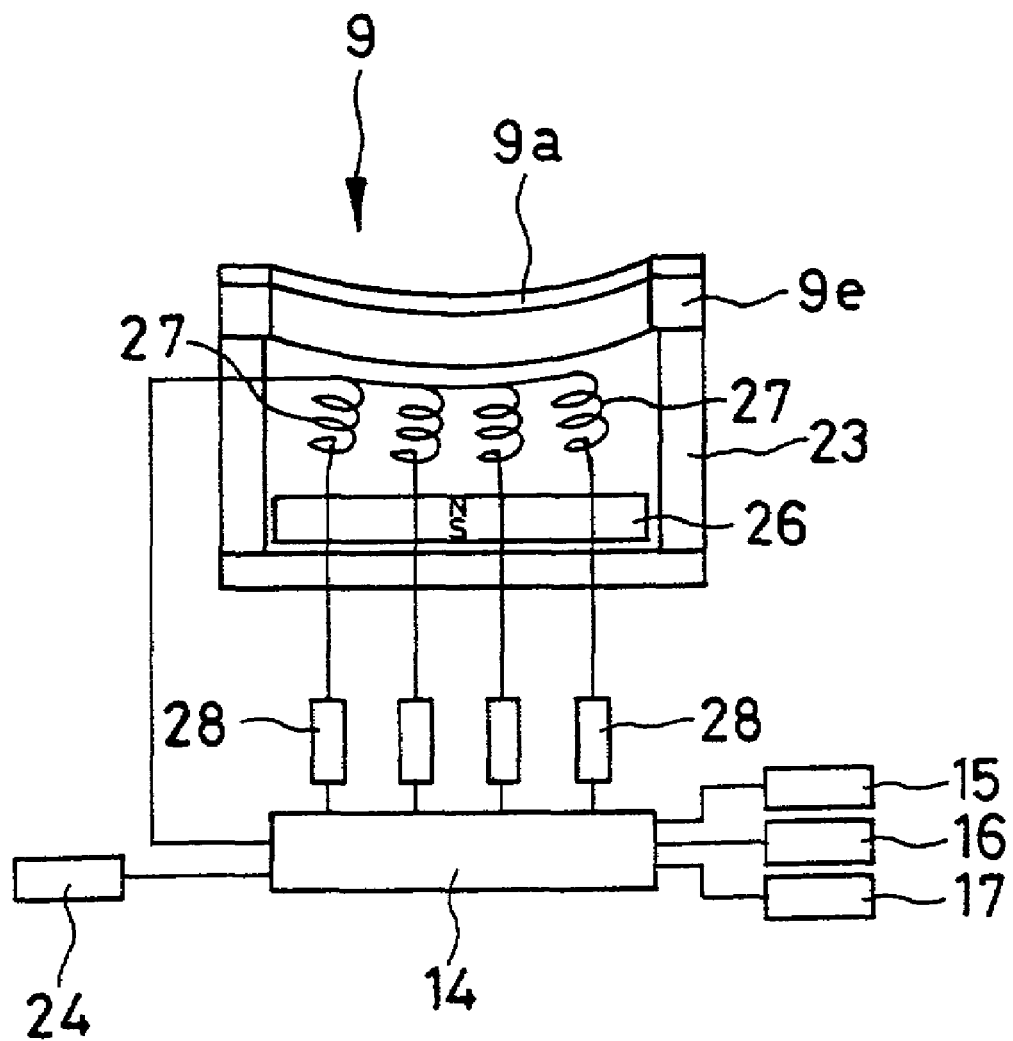
FIG. 9 is a diagram showing a further embodiment of the variable mirror.

FIG. 9 shows a further embodiment of the variable mirror 9. This embodiment utilizes electromagnetic force to allow the configuration of a reflecting surface to be changed. A permanent magnet 26 is provided on the inner bottom surface of a support plate 23, and the peripheral edge portion of a substrate 9 e made of silicon nitride or a polyimide is placed on and secured to the top of the support plate 23. The surface of the substrate 9e is provided with a thin film 9a formed from a metal coating, e.g. aluminum, to form a variable mirror 9. A plurality of coils 27 are provided on the lower side of the substrate 9e. The coils 27 are connected to the computing unit 14 through respective driving circuits 28. Accordingly, when an appropriate electric current is supplied to each coil 27 from the associated driving circuit 28 according to an output signal from the computing unit 14 corresponding to changes in the optical system obtained by the computing unit 14 on the basis of signals from the sensors 15, 16, 17 and 24, each coil 27 is repelled or attracted by electromagnetic force acting between it and the permanent magnet 26, causing the substrate 9e and the thin film 9a to be deformed.

In this case, the coils 27 may be supplied with different amounts of electric current. The number of coils 27 may be one. The arrangement may be such that the permanent magnet 26 is provided on the substrate 9e and the coils 27 are provided on the inner bottom surface of the support plate 23. The coils 27 should preferably be formed by lithography or other similar technique. Further, a core made of a ferromagnetic material may be inserted into each coil 27.

Figure 10:
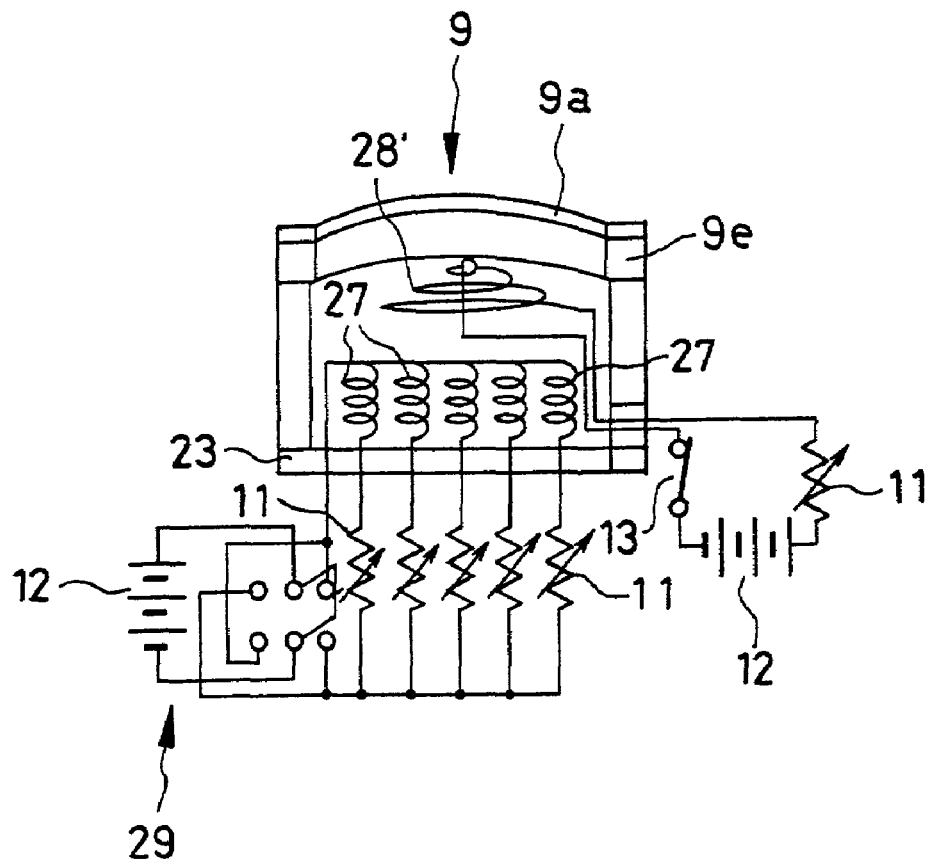
FIG. 10 is a diagram showing a further embodiment of the variable mirror.

FIG. 10 shows a further embodiment of the variable mirror 9. In this embodiment, a thin-film coil 28' is provided on the lower surface of the substrate 9e, and coils 27 are provided on the inner bottom surface of the support plate 23 to face the thin-film coil 28'. The thin-film coil 28' is connected with a variable resistor 11, a power supply 12 and a power switch 13 to supply an appropriate electric current thereto according to need. Each coil 27 is connected with a variable resistor 11. In addition, a power supply 12 is provided to supply an electric current to the coils 27 and the variable resistors 11, and a switch 29 serving as both a selector switch and a power on/off switch is provided to change the direction of electric current flowing through the coils 27. Therefore, according to this embodiment, by changing the resistance value of each variable resistor 11, electromagnetic force acting between each coil 27 and the thin-film coil 28' is varied, and thus the substrate 9e and the thin film 9a are deformed. In this way, the thin film 9a can be operated as a variable mirror. By reversing the switch 29 so as to change the direction of electric current flowing through the coils 27, the thin film 9a can be changed into either a concave surface or a convex surface.

Figure 11:
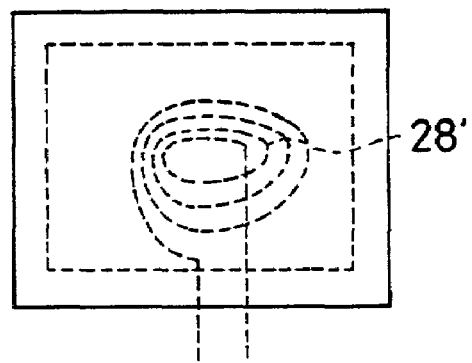
FIG. 11 is a diagram showing the way in which the winding density of a thin-film coil varies according to the position.
Figure 12:
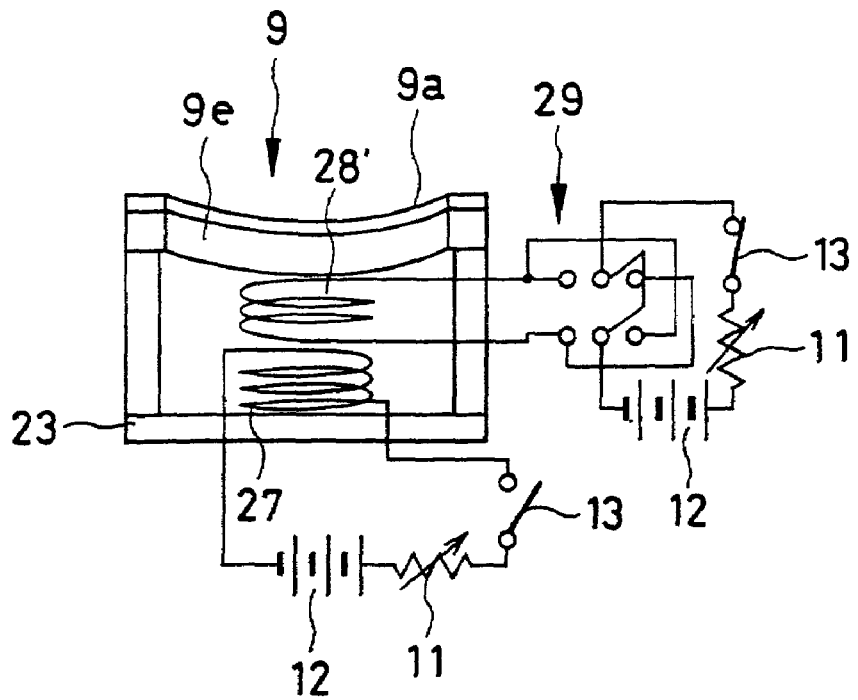
FIG. 12 is a diagram showing an arrangement using a single coil.

In this case, it is also possible to deform the substrate 9e and the thin film 9a as desired by varying the winding density of the thin-film coil 28' according to the position, as shown in FIG. 11. As shown in FIG. 12, the number of coils 27 may be one. Further, a core made of a ferromagnetic material may be inserted into each coil 27. If a magnetic fluid is filled into a space formed by the support plate 23, the electromagnetic force becomes stronger.

Figure 13:
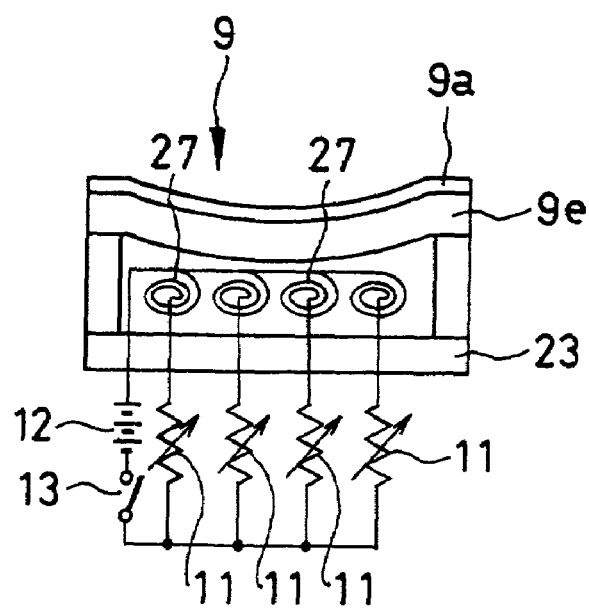
FIG. 13 is a diagram showing a further embodiment of the variable mirror.
Figure 14:
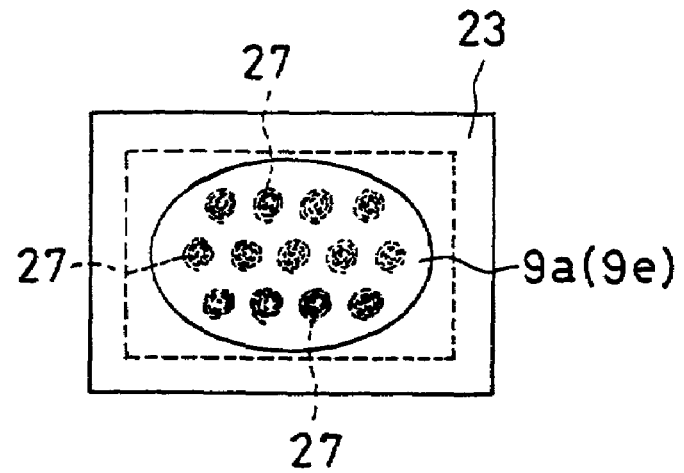
FIG. 14 is a diagram showing another example of the arrangement of coils.
Figure 15:
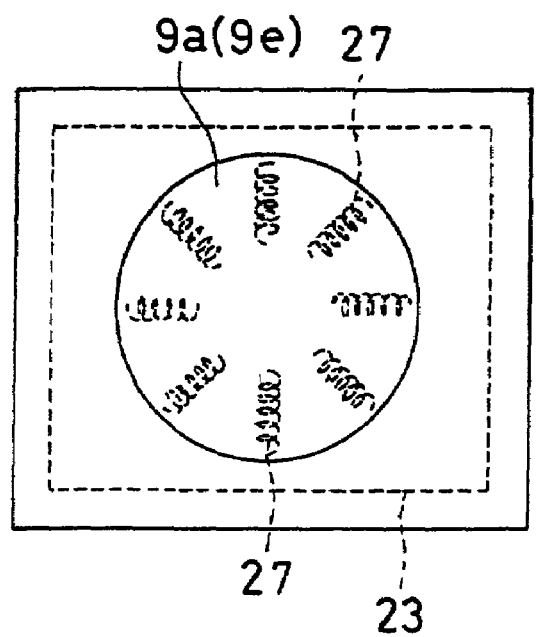
FIG. 15 is a diagram showing another example of the arrangement of coils.
Figure 16:
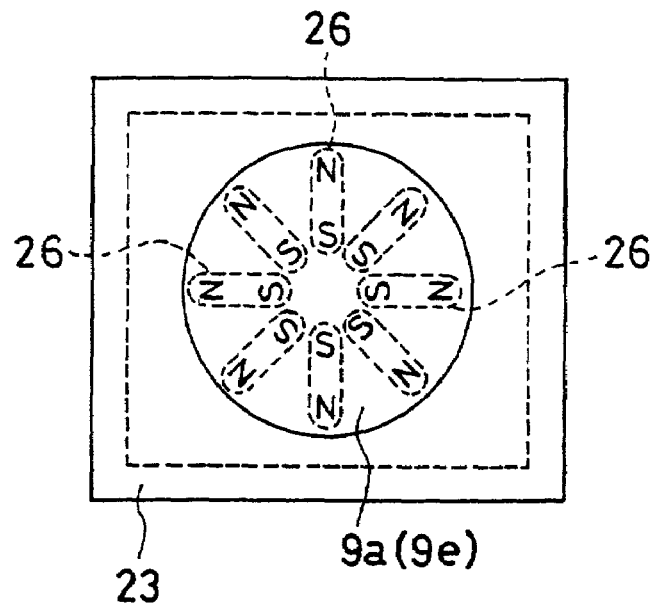
FIG. 16 is a diagram showing the arrangement of permanent magnets in the embodiment shown in FIG. 9.

FIG. 13 shows a further embodiment of the variable mirror 9. In this example, a substrate 9e is made of a ferromagnetic material, e.g. iron, and a thin film 9a as a reflecting film is made of aluminum or the like. In this case, a thin-film coil need not be provided. Therefore, the structure is simple in comparison to the example shown in FIG. 10, for example, and the production cost can be reduced. If the power switch 13 is replaced with the switch 29 serving as both a selector switch and a power on/off switch (see FIG. 10), it is possible to change the direction of electric current flowing through the coils 27 and to freely change the configuration of the stack of the substrate 9e and the thin film 9a. FIG. 14 shows the arrangement of the coils 27 in this example, and FIG. 15 shows another example of the arrangement of the coils 27. These arrangements are also applicable to the examples shown in FIGS. 9 and 10. It should be noted that FIG. 16 shows an arrangement of permanent magnets 26 that is suitable in a case where in the example shown in FIG. 9 the coils 27 are arranged as shown in FIG. 15. That is, if the permanent magnets 26 are radially arranged as shown in FIG. 16, the substrate 9e and the thin film 9a can be deformed even more delicately than in the embodiment shown in FIG. 9. In addition, in a case where the substrate 9e and the thin film 9a are deformed by using electromagnetic force in this way (the embodiments shown in FIGS. 9, 10 and 13), they can be driven at a lower voltage than in the case of using electrostatic force, advantageously.

In the foregoing, some examples of variable mirrors have been described. To deform such a mirror, two or more different kinds of force may be used as in the example shown in FIG. 8. That is, a variable mirror can be deformed by simultaneously using two or more selected from the group consisting of electrostatic force, electromagnetic force, a piezoelectric effect, magnetostriction, a fluid pressure, an electric field, a magnetic field, a temperature change, an electromagnetic wave, etc. In other words, if a variable-optical-characteristic optical element is formed by using two or more different driving methods, a large deformation and a small deformation can be realized simultaneously. Accordingly, it is possible to realize a mirror surface with a high degree of accuracy. This idea is also applicable to variable-focus lenses described below.

Figure 17:
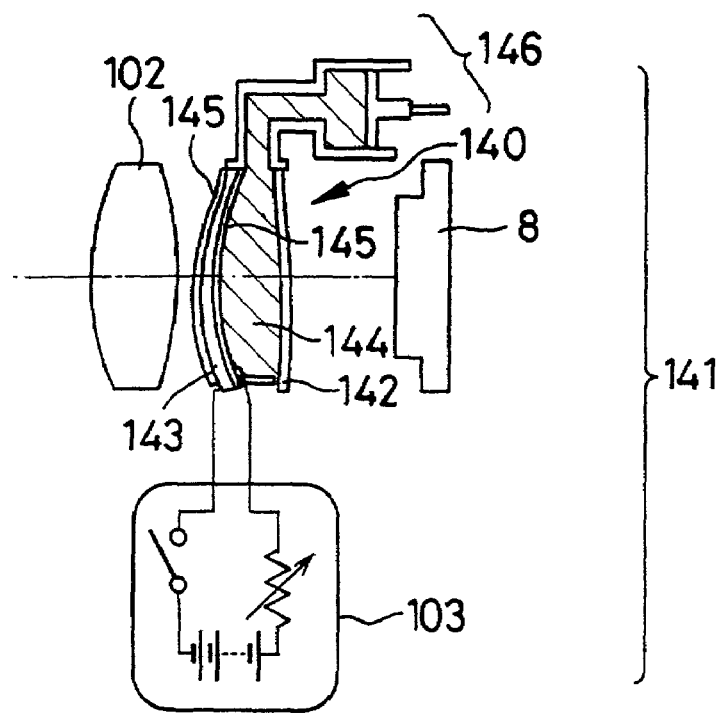
FIG. 17 is a diagram showing the arrangement of one embodiment of an image pickup unit using a variable-focus lens according to the present invention.

FIG. 17 is a diagram showing the arrangement of a further example of the present invention. The figure shows an example of an image pickup unit 141 using a variable-focus lens 140. A combination of a convex lens 102 and the variable-focus lens 140 forms an imaging lens. The imaging lens is combined with a solid-state image pickup device 8 to form an image pickup unit.

The variable-focus lens 140 has a transparent member 142 and a soft transparent substance 143 having piezoelectricity, e.g. a synthetic resin material. The transparent member 142 and the transparent substance 143 sandwich a light-transmitting fluid or jelly-like substance 144 therebetween. Examples of substances usable as the fluid or jelly-like substance 144 are silicone oil, elastic rubber, jelly, and water.

Transparent electrodes 145 are provided on both sides of the soft transparent substance 143. When a predetermined voltage is applied between the transparent electrodes 145 from an electronic circuit 103, the soft transparent substance 143 is deformed by the piezoelectric effect thereof, causing the focal length of the variable-focus lens 140 to be changed. Accordingly, even when the object distance has changed, focusing can be effected without moving the optical system by a motor or the like. Thus, the image pickup unit 141 is excellent in that the structure is compact and lightweight and the power consumption is favorably small. It should be noted that reference numeral 146 in FIG. 17 denotes a cylinder for storing the fluid or jelly-like substance 144. It should be noted that examples of materials usable as the soft transparent substance 143 having piezoelectricity are polymer piezoelectric materials, e.g. polyurethane, silicone rubber, acrylic elastomer, PZT, PLZT, and polyvinylidene fluoride (PVDF), and copolymers, e.g. vinylidene cyanide copolymer, and a vinylidene fluoride-trifluoroethylene copolymer.

In a case where an electrostrictive material, e.g. acrylic elastomer or silicone rubber, is used as the soft transparent substance 143, it is possible to form the soft transparent substance 143 in a structure in which a transparent substrate and an electrostrictive material are cemented together.

It is preferable to use an organic material having piezoelectricity, a synthetic resin material having piezoelectricity, an elastomer exhibiting piezoelectricity, etc. The use of such a material makes it possible to realize a large deformation of the variable-focus lens surface. It should be noted that a transparent piezoelectric material should preferably be used for the variable-focus lens 140, as a matter of course.

These materials are also usable for variable mirrors using a piezoelectric effect. The use of such materials allows realization of variable mirrors capable of being deformed to a considerable extent.

In the example shown in FIG. 17, the cylinder 146 may be omitted. That is, the variable-focus lens 140 may have a structure in which the cylinder 146 is omitted, as shown in part (a) of FIG. 18. In this case, support members 147 secure certain peripheral portions of the soft transparent substance 143 having piezoelectricity. Even when the transparent substance 143 is deformed, as shown in part (b) of FIG. 18, under application of a voltage to the soft transparent substance 143, the deformation causes no change in the volumetric capacity of the variable-focus lens 140. Therefore, the cylinder 146 is unnecessary. Reference numeral 148 denotes deformable members made of an elastic material or an accordion-shaped synthetic resin or metallic material.

The electronic circuit 103 may include a booster circuit. It is preferable to form the booster circuit by using a piezoelectric transformer or the like from the viewpoint of realizing a compact structure. -The booster circuit is usable for all the variable-optical-characteristic optical elements in the present invention.

In the examples shown in FIGS. 17 and 18, if the voltage is applied inversely, the soft transparent substance 143 having piezoelectricity is deformed in the opposite direction. Therefore, the variable-focus lens 140 can be formed into a concave lens.

FIG. 19 is a diagram showing another example of the variable-focus lenses. The figure shows an example of a variable-focus lens 162 in which a fluid 161 is forced in and out by micropumps 160, thereby deforming the lens surface. The micropumps 160 are small-sized pumps produced by micromachine techniques, for example, which operate on electric power. The fluid 161 is sandwiched between a transparent substrate 163 and an elastic material 164. Reference numeral 165 denotes a transparent substrate for protecting the elastic material 164. The transparent substrate 165 may be omitted. Examples of the pumps 160 produced by micromachine techniques include micropumps utilizing thermal deformation, micropumps using a piezoelectric material, and micropumps using electrostatic force. The transparent substrate 165 may be a lens. It should be noted that reference numeral 400 in the figure denotes spacers.

Figure 20:
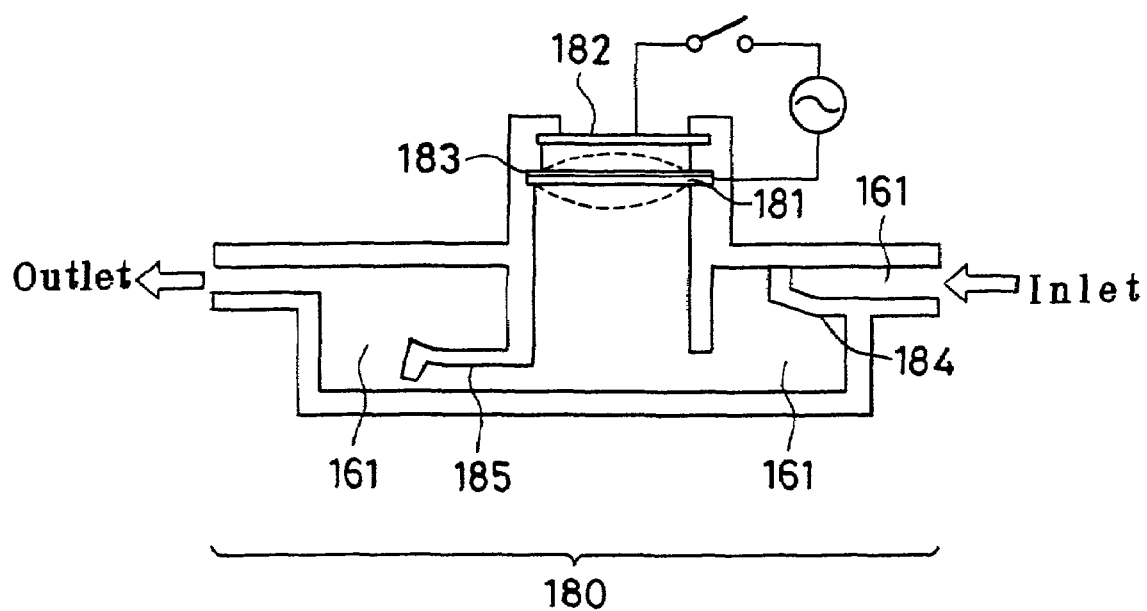
FIG. 20 is a diagram showing the arrangement of an example of the micropump.

FIG. 20 is a diagram showing the arrangement of a micropump 180 as an example. A diaphragm 181 vibrates on electric power by the action of electrostatic force or a piezoelectric effect, for example. FIG. 20 shows an example in which the diaphragm 181 is vibrated by electrostatic force. Reference numerals 182 and 183 denote electrodes. The dotted lines show the vibrator 181 as deformed. In response to the vibration of the diaphragm 181, two valves 184 and 185 are opened or closed to send the fluid 161 from the right toward the left in the figure. For example, two micropumps 180 may be used as shown in FIG. 19 (in FIG. 19, the micropumps 160 correspond to the micropumps 180 ).

Figure 21:
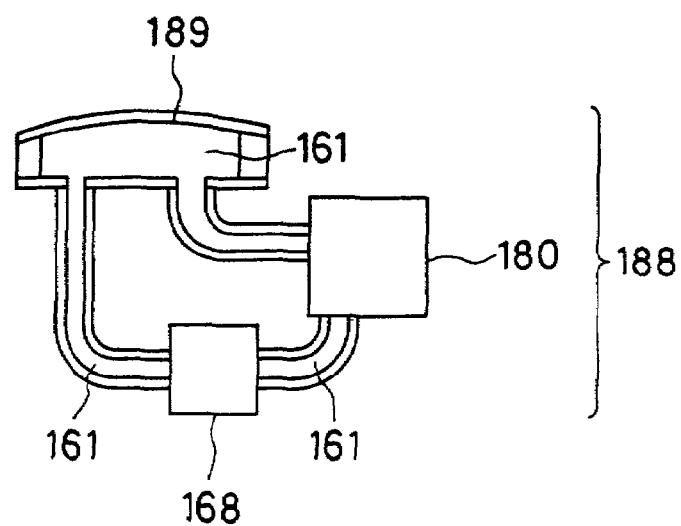
FIG. 21 is a diagram showing the arrangement of an embodiment of a variable mirror according to the present invention that uses a fluid pump.

FIG. 21 shows an example of a variable mirror 188 using the fluid pump 180. A reflecting membrane 189 is deformed into either a concave or convex shape according to the amount of fluid 161, thereby functioning as a variable mirror.

Figure 22:
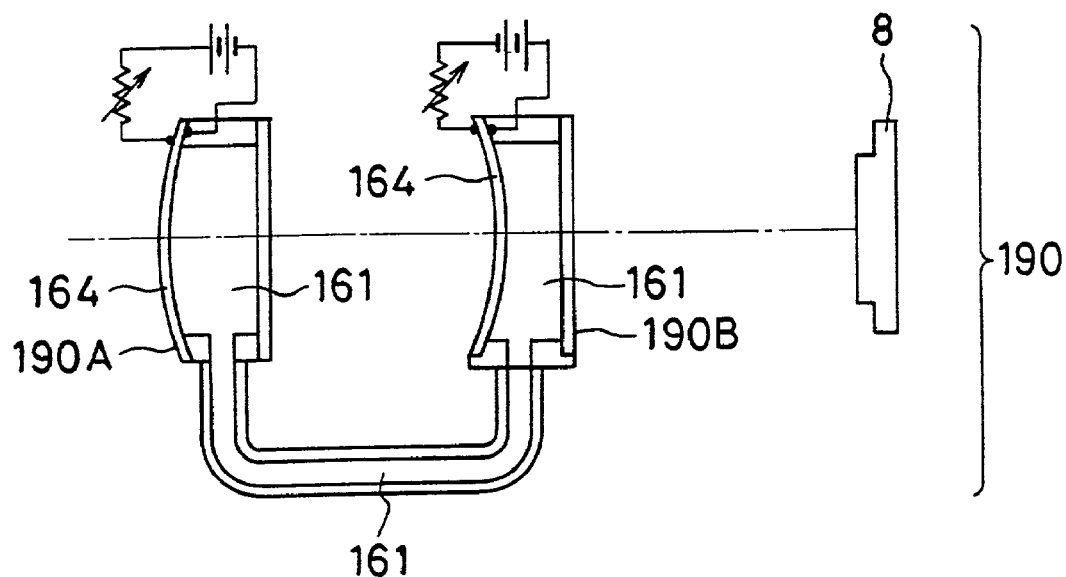
FIG. 22 is a diagram showing the arrangement of an embodiment of a variable-focus lens according to the present invention that is deformable by a piezoelectric effect.

FIG. 22 shows an example of a variable-focus lens 190 that is deformed by a piezoelectric effect. The variable-focus lens 190 comprises two variable-focus lens elements 190A and 190B. The variable-focus lens elements 190A and 190B are connected with each other through a flow path, e.g. a pipe, so that the fluid 161 is movable between the two lens elements 190A and 190B. Voltages with opposite signs are applied to the respective elastic materials 164 of the variable-focus lens elements 190A and 190B so that the elastic materials 164 are deformed in opposite directions to each other. Accordingly, the fluid reservoir 168 is not necessary. In this point, the illustrated example is superior.

The variable-focus lens 190 arranged as shown in FIG. 22 allows two variable-focus lens elements 190A and 190B to be implemented simultaneously. The variable-focus lens 190 is suitable for use in a zoom lens system, an optical system demanded to provide a wide focusing range, a variable-magnification optical system, etc. FIG. 22 shows an example of a zoom image pickup system (for digital cameras and camcorders) in which the variable-focus lens elements 190A and 190B are combined with a solid-state image pickup device 8. It is a matter of course that the driving method is not necessarily limited to the piezoelectric effect. For example, electrostatic force or electromagnetic force may be used to drive the variable-focus lens elements 190A and 190B. Alternatively, a different driving method may be used for only either one of the variable-focus lens elements 190A and 190B. Alternatively, reflecting membranes may be provided on the respective surfaces of the elastic materials 164 to form two variable mirrors. The arrangement may also be such that one of the two elements forms a variable mirror and the other forms a variable-focus lens.

The basic idea of this embodiment is that a fluid 161 used for the same purpose is shared among a plurality of variable-optical-characteristic optical elements. The idea is also applicable to a combination of three or more variable-optical-characteristic optical elements. It is also possible to use a jelly-like substance in place of the fluid, as in the case of the example shown in FIG. 17.

Incidentally, variable mirrors, variable-focus lenses, etc. using electrostatic force or a piezoelectric effect may require a high voltage for driving. In such a case, a step-up transformer or a piezoelectric transformer should preferably be used. It is particularly preferable to use a laminated piezoelectric transformer from the viewpoint of achieving a compact size.

Figure 23:
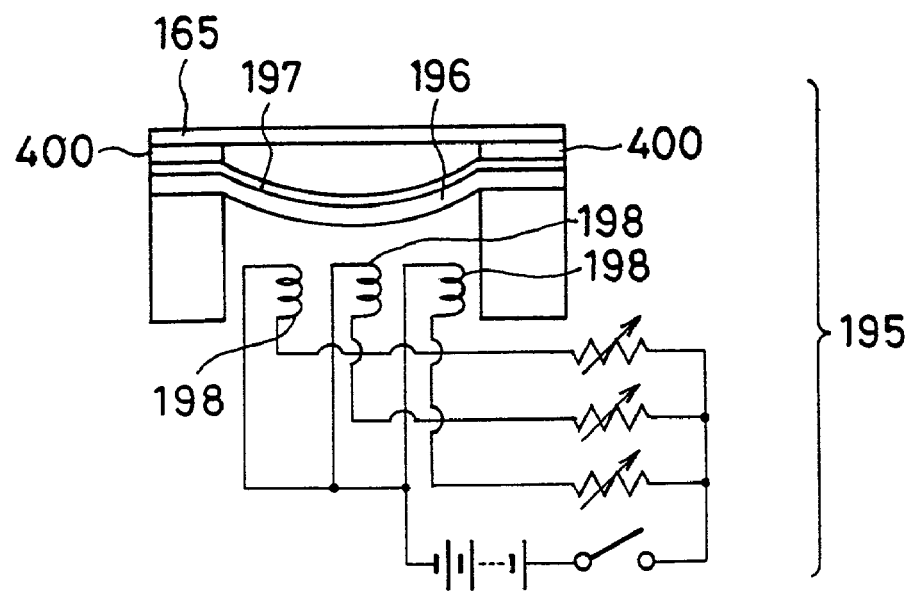
FIG. 23 is a diagram showing the arrangement of an embodiment of a variable mirror according to the present invention that uses a magnetostrictive material.

FIG. 23 is a diagram showing an example of variable-optical-characteristic optical elements. The figure shows an example of a variable mirror 195 using a magnetostrictive material. A membrane 196 is made of a magnetostrictive material. A reflecting membrane 197 (e.g. aluminum) is provided on the membrane 196. When an electric current is passed through coils 198, a magnetic field is applied to the membrane 196, causing the membrane 196 to be deformed. The membrane 196 can be deformed into either a convex surface or a concave surface by changing the direction of the electric current. This arrangement has the merit of requiring no high voltage. It is also possible to deform the membrane 196 into various shapes by providing a plurality of coils 198 and varying electric currents supplied to the coils 198. Examples of preferable magnetostrictive materials are cobalt, nickel, alfer, cadmium, iron-aluminum alloy, iron-silicon alloy, nickel-chromium alloy, nickel-vanadium alloy, iron-cobalt alloy, nickel-cobalt alloy, spinel ferrite, garnet ferrite, and super magnetostrictive alloy. The arrangement may be such that that the membrane 196 made of a magnetostrictive material is formed from a ferromagnetic material, and the membrane 196 is deformed by magnetic force acting between the membrane 196 and the coils 198. Examples of ferromagnetic materials usable include iron and cobalt. It should be noted that reference numeral 165 in FIG. 23 denotes a transparent member for protecting the variable mirror 195. In particular, the transparent member 165 has the effect of protecting the surface of the reflecting membrane 197. It should be noted that the transparent member 165 may be a lens.

Figure 24:
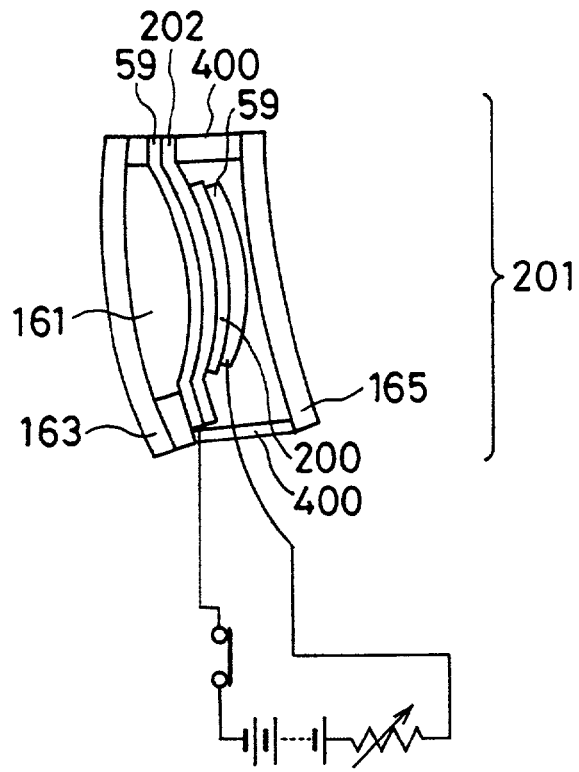
FIG. 24 is a diagram showing the arrangement of an embodiment of a variable-focus lens according to the present invention that uses a piezoelectric material.
Figure 25:
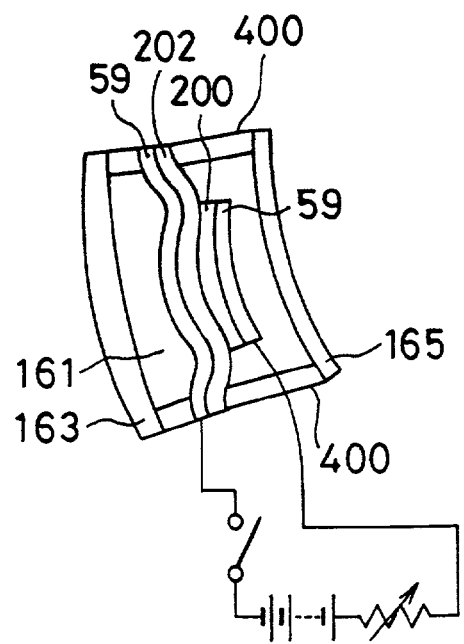
FIG. 25 is a diagram showing the arrangement of a modification of the embodiment of the variable-focus lens shown in FIG. 24.

FIG. 24 is a diagram showing an example of variable-optical-characteristic optical elements. The figure shows an example of a variable-focus lens 201 using a piezoelectric material 200. As the piezoelectric material 200, a material similar to the transparent substance 143 is usable. The piezoelectric material 200 is provided on a transparent soft substrate 202. As the substrate 202, it is desirable to use a synthetic resin material or an organic material. When a voltage is applied to the piezoelectric material 200 through transparent electrodes 59, the piezoelectric material 200 is deformed. In FIG. 24, the optical element has a convex lens action. The arrangement may be as follows. The substrate 202 is formed in a convex shape in advance, and the size of at least one of the two transparent electrodes 59 is made different from the size of the substrate 202. That is, one transparent electrode 59 is made smaller than the substrate 202 as shown in FIG. 25, by way of example. With this arrangement, when the supply of the voltage is cut off, or when the voltage is lowered, the other transparent electrode 59 is concavely deformed at only a certain portion thereof, as shown in FIG. 25. Consequently, the optical element has a concave lens action and operates as a variable-focus lens. At this time, the substrate 202 is deformed in such a manner that the volumetric capacity of the fluid 161 will not change. Therefore, the illustrated example has the merit of dispensing with the fluid reservoir 168. In this example, a part of the substrate 202 retaining the fluid 161 is deformed by the piezoelectric material 200 to dispense with the fluid reservoir 168. This is a great advantage of this example.

It should be noted that the transparent member 142 and the transparent substrate 163 may be lenses or plane-parallel plates. This is true of the examples shown in FIGS. 1, 2, 17 and 19.

Figure 26:
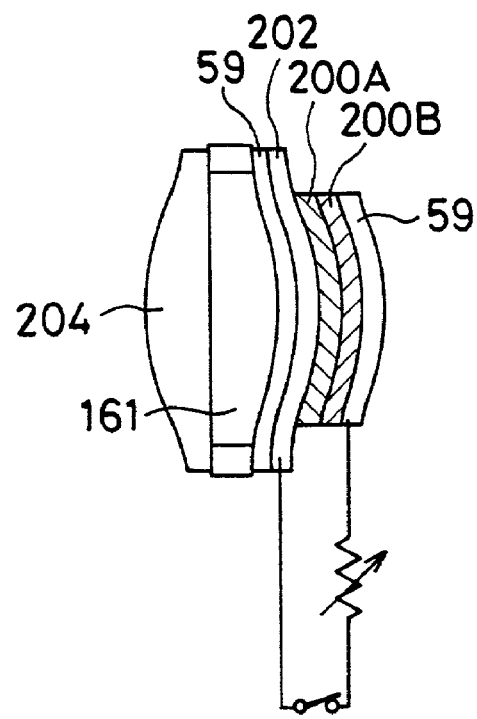
FIG. 26 is a diagram showing the arrangement of an embodiment of a variable-focus lens according to the present invention that uses two thin films of a piezoelectric material.

FIG. 26 is a diagram showing an example of variable-optical-characteristic optical elements. The figure shows an example of a variable-focus lens using two thin films 200A and 200B made of a piezoelectric material. The illustrated example has the merit of increasing the amount of deformation to obtain a large variable focus range by inverting the directional properties of the materials of the thin films 200A and 200B. Reference numeral 204 denotes a lens-shaped transparent substrate. In this example also, the right-hand transparent electrode 59 in the figure is formed smaller in size than the substrate 202. It should be noted that the thickness of each of the substrate 202 and the piezoelectric materials 200, 200A and 200B may be made nonuniform so as to control the way in which deformation takes place when a voltage is applied. With this arrangement, it is also possible to perform aberration correction for the lens, advantageously.

Figure 27:
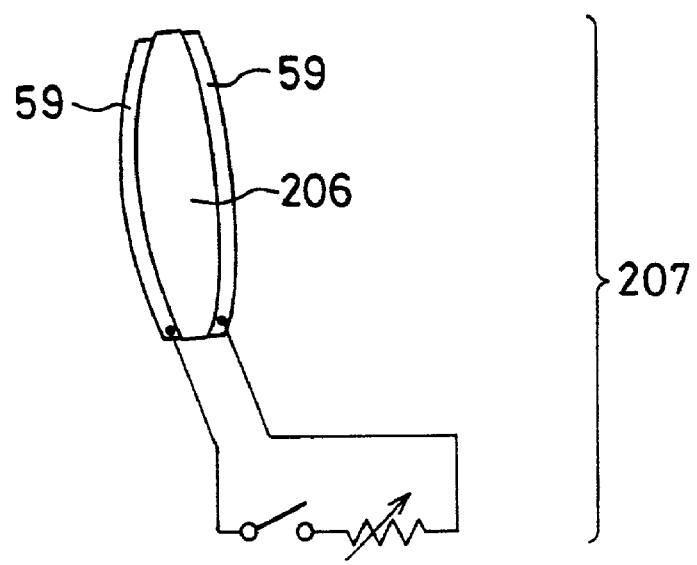
FIG. 27 is a diagram showing the arrangement of an embodiment of a variable-focus lens according to the present invention that uses an electrostrictive material.
Figure 28:
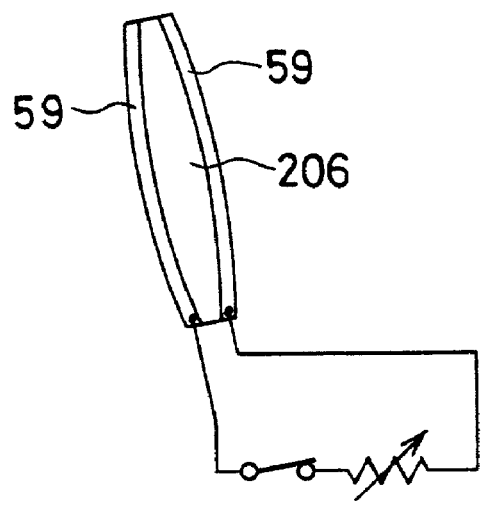
FIG. 28 is a diagram showing the way in which the variable-focus lens shown in FIG. 27 is deformed.

FIG. 27 is a diagram showing an example of variable-focus lenses. The figure shows a variable-focus lens 207 using an electrostrictive material 206, e.g. silicone rubber, or acrylic elastomer. When the applied voltage is low, the lens operates as a convex lens as shown in FIG. 27. When the applied voltage is raised, as shown in FIG. 28, the electrostrictive material 206 elongates vertically and contracts in the horizontal direction as viewed in the figure. As a result, the focal length increases. Accordingly, the lens operates as a variable-focus lens. The illustrated example does not require a large electric current and is therefore advantageous in that the power consumption is small.

Figure 29:
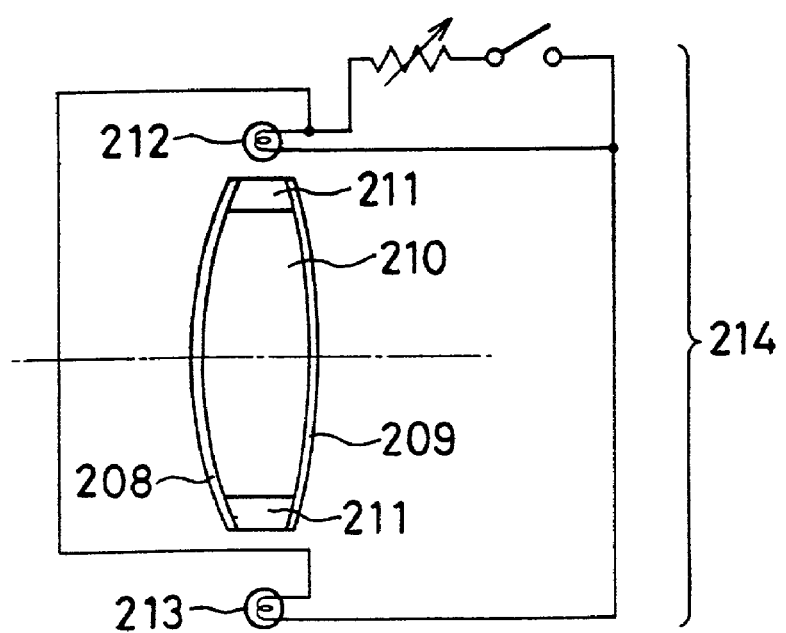
FIG. 29 is a diagram showing the arrangement of an embodiment of a variable-focus lens according to the present invention that uses a photomechanical effect.
Figure 30A:
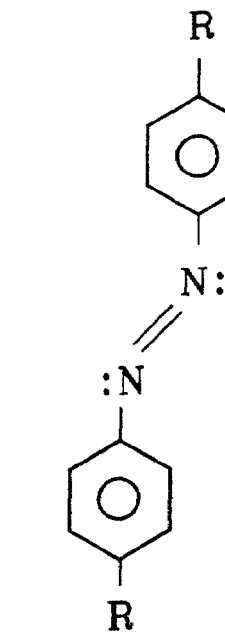
FIG. 30 is a diagram showing the state change of transform azobenzene.
Figure 30B:
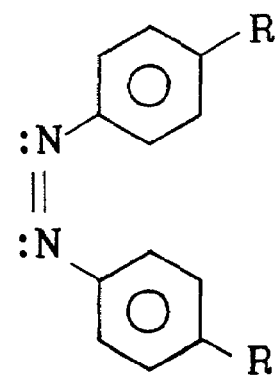

FIG. 29 is a diagram showing an example of variable-optical-characteristic optical elements. The figure shows an example of a variable-focus lens 214 using a photomechanical effect. Transparent elastic materials 208 and 209 sandwich azobenzene 210 therebetween. The azobenzene 210 is irradiated with ultraviolet light through transparent spacers 211. Reference numerals 212 and 213 denote ultraviolet light sources having center wavelengths $\lambda_1$ and $\lambda_2$, respectively, which are, for example, ultraviolet LEDs or ultraviolet semiconductor lasers. When trans-form azobenzene shown in part (A) of FIG. 30 is irradiated with ultraviolet light of $\lambda_1$, it changes into cis-form azobenzene shown in part (B) of FIG. 30, resulting in a reduction in the volumetric capacity of the azobenzene 210. Accordingly, the configuration of the variable-focus lens 214 thins. Thus, the convex lens action weakens. When the azobenzene 210 is irradiated with ultraviolet light of $\lambda_2$, it changes from the cis form to the trans form, resulting in an increase in the volumetric capacity of the azobenzene 210. Consequently, the convex lens action increases. In this way, the lens 214 operates as a variable-focus lens. Ultraviolet light is totally reflected at the interface surface between air and each of the transparent elastic materials 208 and 209. Therefore, no light will leak to the outside. Accordingly, the variable-focus lens 214 can operate efficiently.

Variable-focus lenses driven by the photomechanical effect are suitable for use in variable-focus eyeglasses or the like, and they are also suitably used as contact lenses. The variable-focus lenses are conveniently used as contact lenses because the focal length of each contact lens in use can be changed in non-contact manner.

Next, embodiments of optical apparatus using the foregoing variable-optical-characteristic optical elements will be shown.

Figure 31:
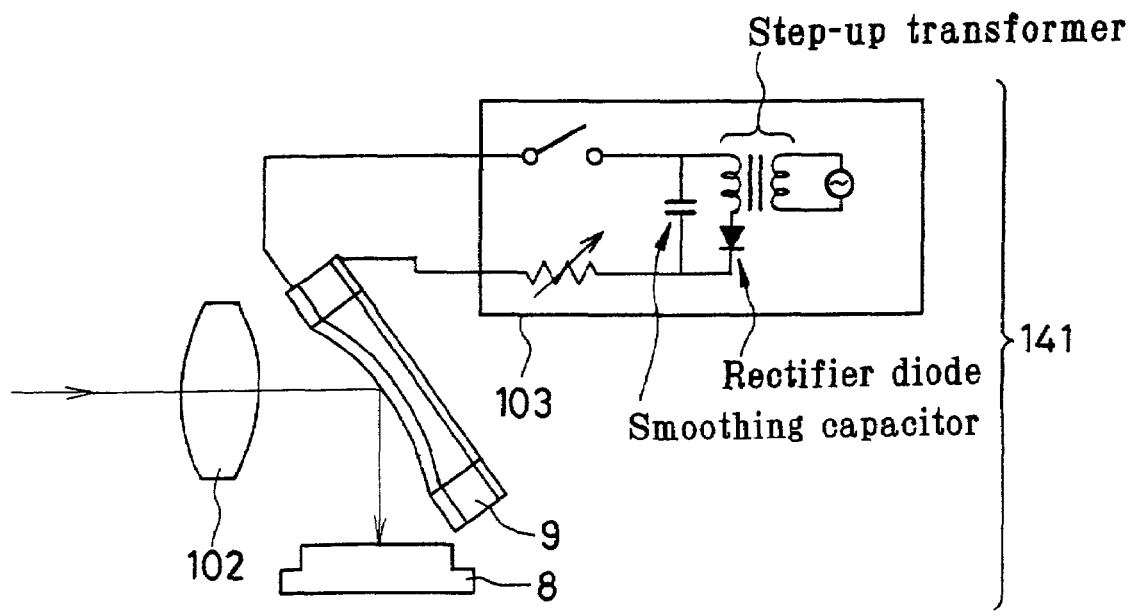
FIG. 31 is a schematic view showing an example of an image pickup system using a variable mirror according to the present invention.

FIG. 31 is a schematic view showing an example of an image pickup system using a variable mirror 9 according to a further embodiment of the present invention, for example, an image pickup system for use in a digital camera attached to a portable telephone, a capsule endoscope, a video endoscope, a digital camera for a personal computer, a digital camera for a PDA, etc.

The image pickup system according to this embodiment has a variable mirror 9, a lens 102, a solid-state image pickup device 8 and a control system 103 arranged to form a single image pickup unit 141. In the image pickup unit 141 of this embodiment, light from an object passing through the lens 102 is collected by the variable mirror 9 to form an image on the solid-state image pickup device 8. The variable mirror 9 is a kind of variable-optical-characteristic optical element and also known as "variable-focus mirror".

According to this embodiment, even when the object distance has changed, focusing can be effected by deforming the variable mirror 9 without the need to drive the lens by a motor or the like. Therefore, this embodiment is excellent in that it is possible to achieve a compact and lightweight structure and a reduced power consumption. The image pickup unit 141 is usable as an image pickup system in any of the embodiments of the present invention.

It should be noted that FIG. 31 shows a structural example of a control system including a transformer booster circuit using a coil in the control system 103. It is particularly preferable to use a laminated piezoelectric transformer from the viewpoint of achieving a compact size. The booster circuit is usable in any of variable mirrors and variable-focus lenses that use electricity in the present invention. The booster circuit is particularly useful in variable mirrors and variable-focus lenses that use electrostatic force or a piezoelectric effect.

Figure 32:
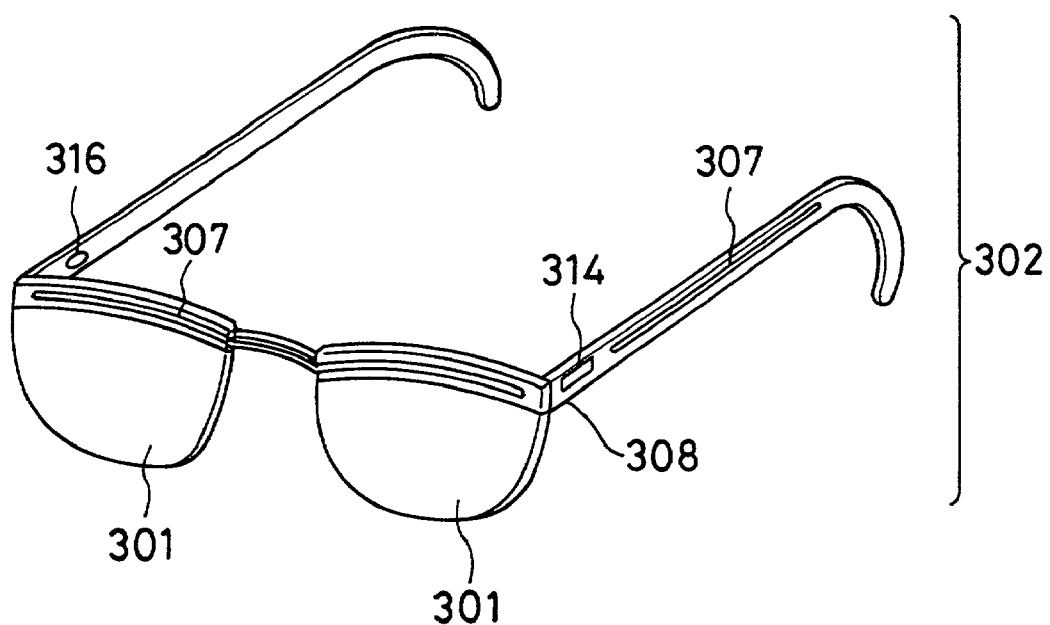
FIG. 32 is a perspective view showing the arrangement of an embodiment of variable-focus eyeglasses using variable-focus lenses according to the present invention.

FIG. 32 shows an example of variable-focus eyeglasses 302 using variable-focus lenses 301. As the variable-focus lenses 301, it is possible to use variable-focus lenses using a liquid crystal in addition to the variable-focus lens 62 in FIG. 1, the variable-focus lens 56 in FIG. 2, the variable-focus lens 140 in FIG. 17, and the variable-focus lens 162 in FIG. 19, which have already been described.

Figure 33:
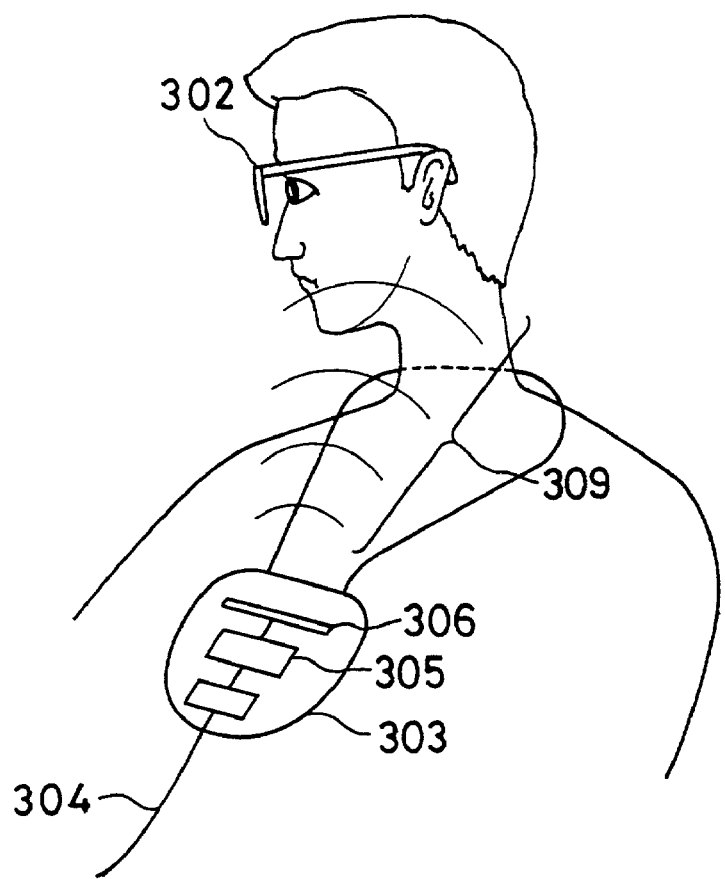
FIG. 33 is a diagram showing the way in which a user wears the variable-focus eyeglasses shown in FIG. 32.

In conventional variable-focus eyeglasses, a cord for power supply is needed, which is bothersome in most cases. In this regard, the variable-focus eyeglasses according to the present invention are supplied with electric power by radio without using a cord, thereby improving the ease of use. Let us describe the method of supplying electric power. As shown in FIG. 33, an electromagnetic wave is used to supply electric power. The user wears a power transmitting unit 303 by hanging it from his/her neck, for example. The power transmitting unit 303 may be put in a clothes pocket or the like. Alternatively, the power transmitting unit 303 may be placed somewhere around the user (e.g. on a desk). In the power transmitting unit 303, a transmitting circuit 305 is driven by power from a power supply 304 (e.g. a battery) to send an electromagnetic wave from a transmitting antenna 306 toward the variable-focus eyeglasses 302. The variable-focus eyeglasses 302 have a receiving antenna 307 provided on eyeglass frames 308 to receive the electromagnetic wave sent from the power transmitting unit 303. The received electromagnetic wave is, for example, boosted in voltage and rectified to drive the variable-focus lenses 140, 56, etc. When the variable-focus lenses 162 or the like are used, the received electromagnetic wave does not always need to be rectified.

It should be noted that the receiving antenna 307 may be made of a transparent electrically conductive material and provided in each variable-focus lens 301. Alternatively, a receiving antenna 307 made of an electrically conductive material may be disposed around each variable-focus lens 301 or in a part thereof.

The power transmitting unit 303 or the power supply 304 may be shared with other equipment, e.g. a portable telephone, a portable audio system, or a notebook computer. If a microwave is used as the electromagnetic wave, a high degree of transmission efficiency is available. The electromagnetic wave sent from the transmitting antenna 306 should preferably be radiated strong in a specific direction in the form of a beam 309. By doing so, the electromagnetic wave can be sent without wasteful energy consumption, and the influence on other electronic equipment is minimized. It is preferable that the electromagnetic wave should be radiated strong upwardly as shown in FIG. 33.

Reference numeral 314 denotes a touch switch. Touching the switch 314 lightly with a finger or the like allows the refractive power of the variable-focus lenses 301 to be changed from one to another or permits ON-OFF switching of electricity. It is preferable to arrange the touch switch 314 so that it operates cyclically according to the number of times at which the switch 314 is touched. By doing so, for example, the distance at which the variable-focus eyeglasses 302 are focused can be switched simply by changing the number of times at which the user touches the switch 314 as follows: near point→middle point→far point→near point→middle point→far point . . . ; or near point→far point→near point→far point . . . . This is convenient.

Further, reference numeral 316 denotes an angle sensor, e.g. a gyro. The variable-focus eyeglasses 302 may be arranged, for example, such that when the user looks down, the variable-focus eyeglasses 302 are focused on the near point, whereas when the user looks up or faces horizontally, the variable-focus eyeglasses 302 are focused on the far point. With this arrangement, control similar to autofocusing can be effected, which is convenient.

Figure 34:
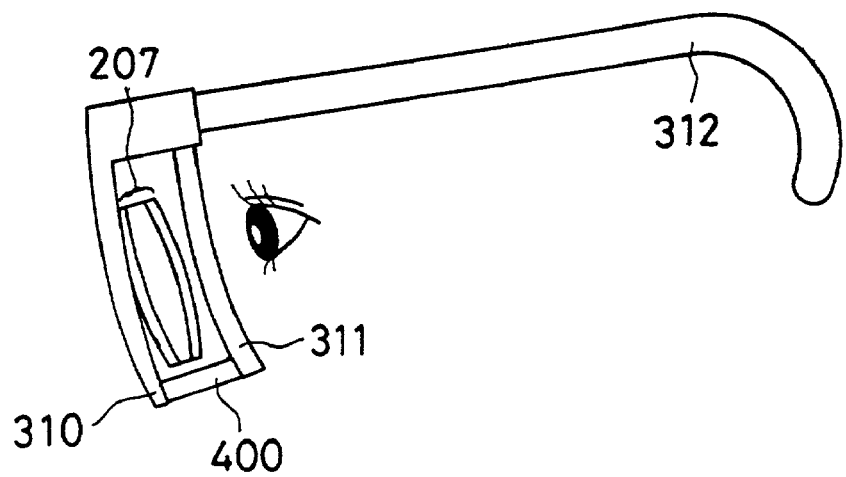
FIG. 34 is a diagram showing the arrangement of an embodiment of variable-focus eyeglasses using variable-focus lenses according to the present invention.

FIG. 34 is a diagram showing an example of variable-focus eyeglasses 302 using the variable-focus lens 207. The variable-focus lens 207 is sandwiched between transparent substrates or lenses 310 and 311 so as to be protected. In addition, a part of the variable-focus lens 207 is secured to the transparent substrate or lens 310. By doing so, the variable-focus lens 207 can be secured without interfering with the expansion and contraction of the electrostrictive material 206 (FIG. 27).

Figure 35:
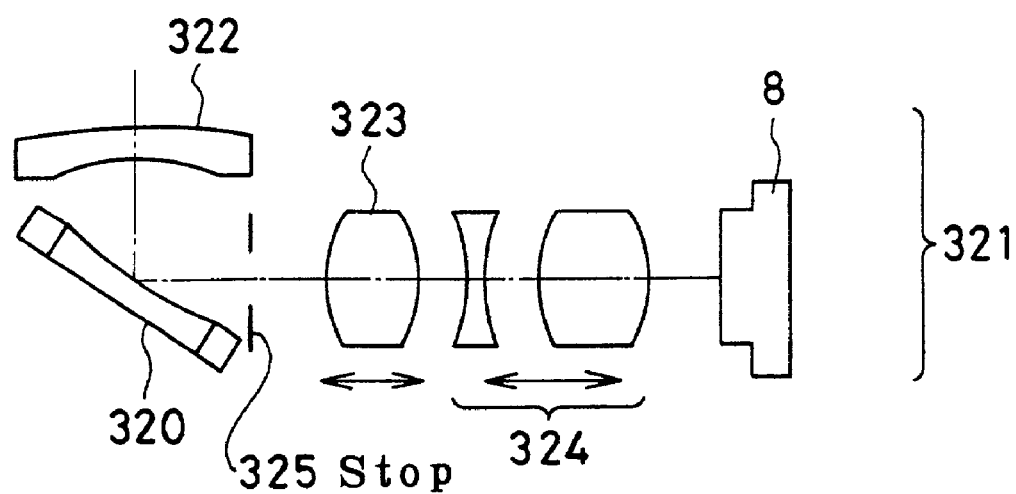
FIG. 35 is a diagram showing the arrangement of an embodiment of an optical system for a zoom digital camera using a variable mirror according to the present invention.

FIG. 35 is a diagram showing an example of the present invention. The figure shows an optical system 321 for a zoom digital camera that uses a variable mirror 320. A lens unit 322 comprising a concave lens is fixed, whereas a lens unit 323 and a lens unit 324 are movable. The lens units 323 and 324 are movable along the optical axis direction as shown by the arrows to effect zooming. Meanwhile, the variable mirror 320 operates for focusing. Because the response is fast, the variable mirror 320 is usable for contrast-detection type autofocusing. In the contrast-detection type autofocusing, the high-frequency component of each of images picked up while being defocused is examined, and the position where the high-frequency component reaches a maximum is decided to be an in-focus position. If the user performs zooming by hand, the motor becomes unnecessary. Accordingly, it is possible to obtain an autofocus zoom digital camera with minimal power consumption. It should be noted that reference numeral 325 in the figure denotes a stop.

The optical system 321 for a zoom digital camera is also usable in other electronic image pickup systems, e.g. TV cameras and camcorders. As the variable mirror, any of the variable mirrors described in this application can be used. It is particularly preferable to use the variable mirrors using electrostatic force, electromagnetic force, a piezoelectric effect or magnetostriction from the viewpoint of the fast response.

In the example shown in FIG. 35, the solid-state image pickup device 8 should preferably be placed so that the short sides of the rectangular image pickup area extend in the vertical direction as viewed in FIG. 35. The reason for this is as follows. Because the image height is small, asymmetric components of aberrations produced by the variable mirror 320 become small. That is, the short-side direction of the image pickup area (which may be not only rectangular but also elliptical or polygonal) should preferably be approximately parallel, more precisely, within 40°, to the optical axis incidence plane of the variable mirror.

In a case where a variable mirror, a variable-focus lens, etc. are used for focusing, zooming or the like of an optical system, it is preferable to store the amount of deformation or the amount of change in the focal length, together with the amount of aberration correction, of such a variable-optical-characteristic optical element in a memory in the form of a look-up table or the like in correspondence to the object distance, the field angle in zooming, etc. By doing so, the operation of focusing, zooming, etc. is facilitated. When there is a change in the object distance or the field angle, the look-up table is referenced, and the variable-focus lens or the variable mirror is deformed into a shape that provides a given focal length.

Figure 36:
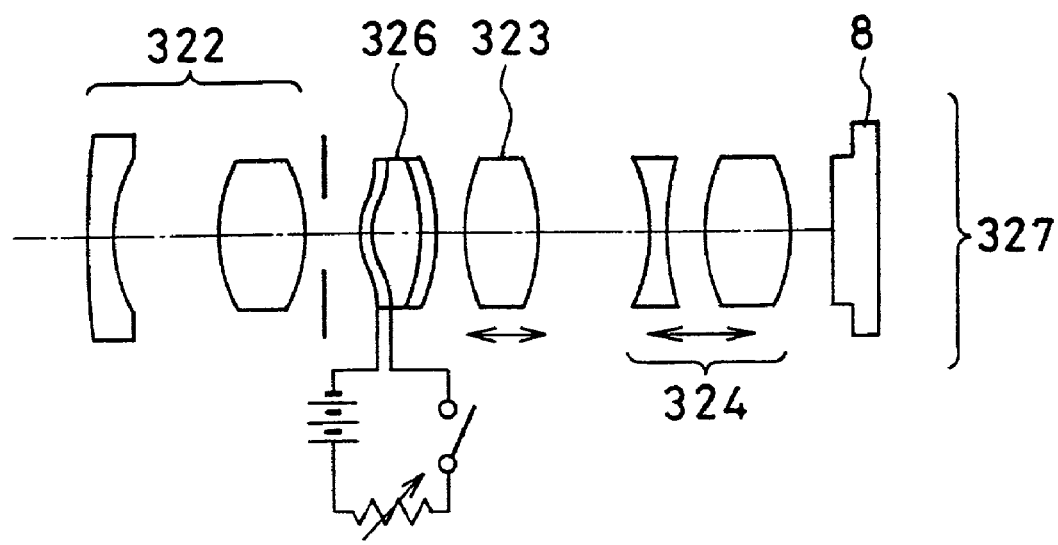
FIG. 36 is a diagram showing the arrangement of an embodiment of a zoom optical system using a variable-focus lens according to the present invention.

FIG. 36 is a diagram showing an example of the present invention. The figure shows a zoom optical system 327 using a variable-focus lens 326 in place of the variable mirror used in FIG. 35. The variable-focus lens 326 is used for focusing. Zooming is performed by moving lens units 323 and 324 with a hand. The use application and effect of the zoom optical system 327 are approximately the same as those of the optical system 321 shown in FIG. 35. The zoom optical system 327 further has an advantage in that the mechanical design of the optical product is easy because the constituent elements of the optical system are arranged in a straight line. As the variable-focus lens 326, it is possible to use a variable-focus lens using a liquid crystal in addition to the variable-focus lenses described in this application. The lens units 323 and 324 may be moved with a motor, a solenoid or the like instead of moving them by hand.

Figure 37:
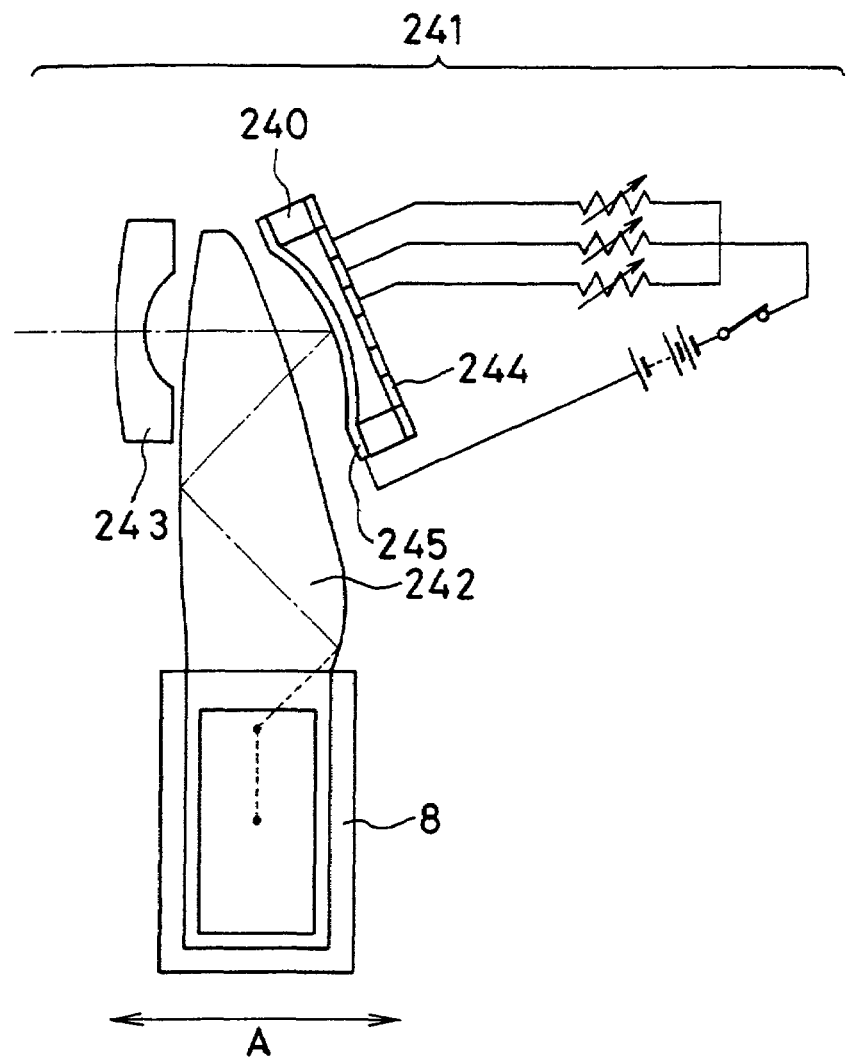
FIG. 37 is a schematic view showing an electronic image pickup apparatus using a variable mirror according to the present invention.

FIG. 37 is a diagram showing an example of the present invention, which is a schematic view of an electronic image pickup apparatus using a variable mirror 240. In the electronic image pickup apparatus 241 according to this embodiment, a free-form surface prism 242 is formed so that an optical path is bent in the plane of the figure and also bent in a direction perpendicular to the plane of the figure (i.e. toward the reverse side of the plane of FIG. 37), thereby allowing the thickness A of the electronic image pickup apparatus 241 to be reduced advantageously. That is, in the free-form surface prism 242, the entering optical axis and the exiting optical axis are in a skew relation to each other. In FIG. 37, reference numeral 243 denotes a lens whose lens surface may be a rotationally symmetric surface or a free-form surface. It is preferable that the optical surfaces of the variable mirror 240, the free-form surface prism 242 and the lens 243 should be formed into extended curved surfaces. It should be noted that the electronic image pickup apparatus 241 in this embodiment is also usable in a card-type digital camera.

Figure 38:
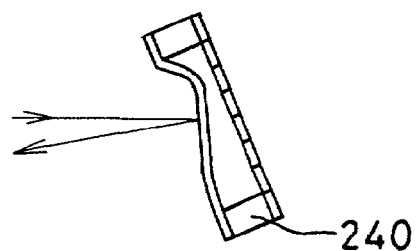
FIG. 38 is a diagram illustrating a state of the variable mirror used in the embodiment shown in FIG. 37.

Let us describe the variable mirror 240 in detail. A reflecting surface 245 of the variable mirror 240 can be deformed into various shapes by applying different voltages to electrodes 244 of the variable mirror 240. For example, the reflecting surface 245 is deformed so as to perform focusing, zooming, etc. by directing the reflected optical axis to the position for image formation. However, the reflecting surface 245 can also be deformed so that the direction of the reflected optical axis differs from the direction for image formation to a considerable extent, as shown in FIG. 38 by way of example. Thus, the incident light can be returned substantially along the direction of incidence of the light, thereby reducing the amount of light incident on the solid-state image pickup device 8. Consequently, the electronic image pickup apparatus 241 operates as a shutter or a stop. Therefore, a conventional mechanical shutter can omitted. In other words, the electronic image pickup apparatus 241 in this embodiment also has the function of controlling the amount of light, advantageously.

Figure 39:
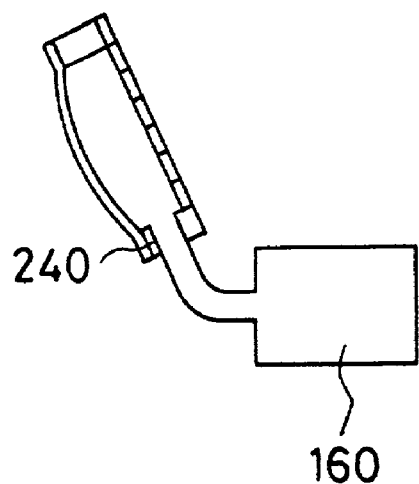
FIG. 39 is a diagram illustrating a modification of the variable mirror used in the embodiment shown in FIG. 37.

It should be noted that the variable mirror 240 may be combined with a micropump 160, as shown in FIG. 39. That is, the variable mirror 240 may be arranged such that the reflecting surface 245 is deformed into a convex surface by using the micropump 160 so as to diverge light to obtain effects similar to the above.

Variable-focus lenses can also be arranged to serve also as a shutter or a stop, in addition to the variable mirrors.

Figure 40:
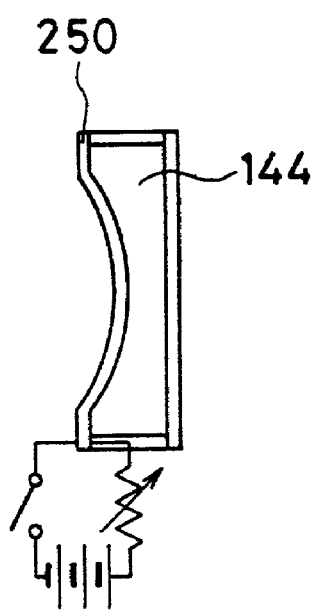
FIG. 40 is a schematic view showing an embodiment of a variable-focus lens arranged to operate also as a shutter or a stop.

FIG. 40 is a schematic view showing an embodiment of a variable-focus lens also serving as a shutter or a stop. The variable-focus lens according to this embodiment has a piezoelectric material 250. When a high voltage is applied thereto, the piezoelectric material 250 forms a strong concave surface to diverge a light beam, thereby substituting for a shutter or a stop.

The above-described operation of controlling or reducing the amount of light in the variable mirrors and variable-focus lenses should preferably be carried out during the charger transfer operation of the solid-state image pickup device 8. By doing so, the operation can be performed without causing blooming, advantageously. These operations of varying the amount of light are based on changes in the light-deflecting characteristics of the variable-optical-characteristic optical elements.

Figure 41:
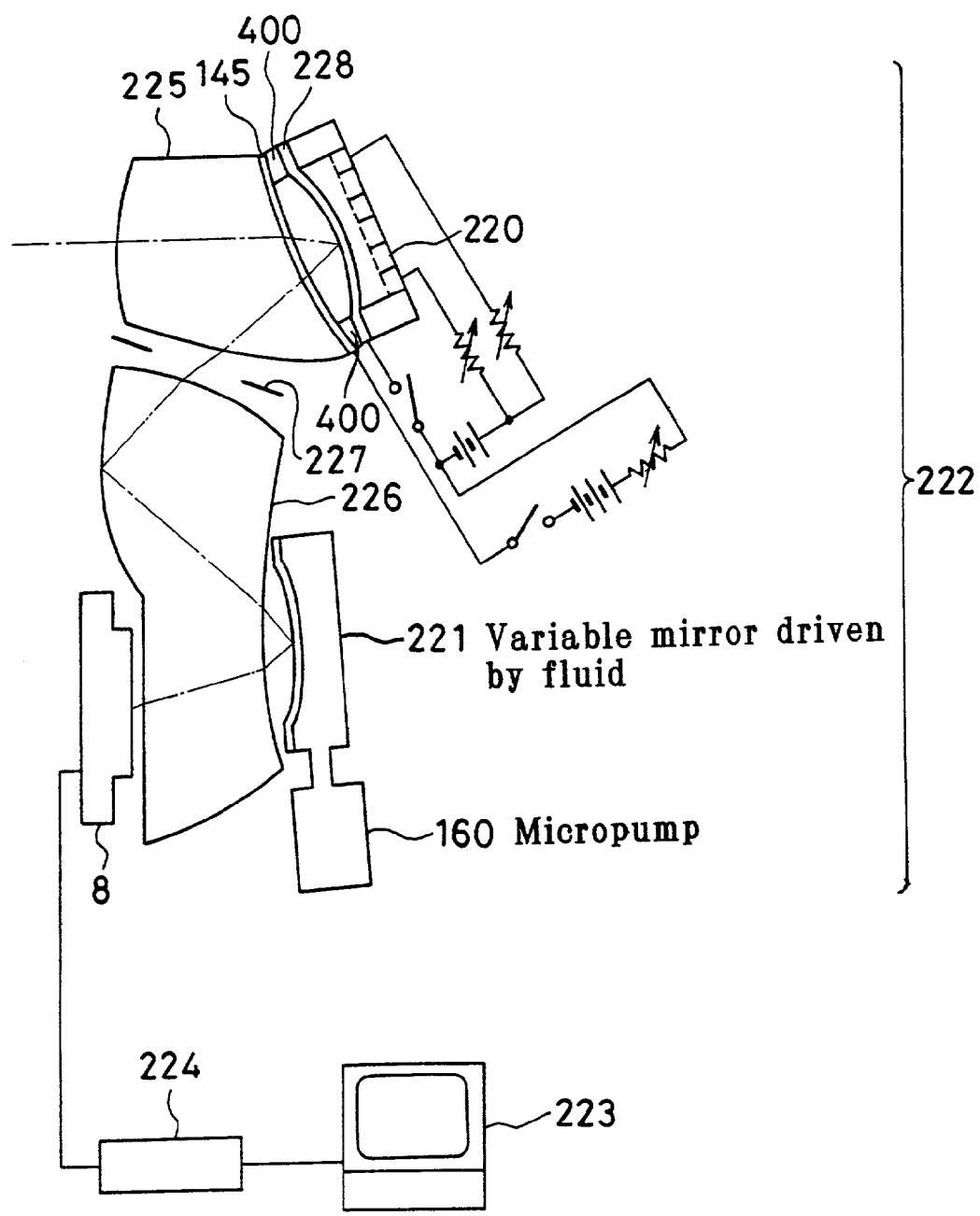
FIG. 41 is a diagram showing the arrangement of an embodiment of a video camera adapted for being mounted on a vehicle, which uses two variable-optical-characteristic optical elements operated by different driving methods according to the present invention.

FIG. 41 is a diagram showing an example of the present invention. The figure shows an example of a vehicle-mounted video camera 222 (i.e. a TV camera adapted for being mounted on an automobile) using two variable-optical-characteristic optical elements (variable mirrors in this example) 220 and 221 operated by different driving methods. In the figure, reference numeral 223 denotes a TV monitor, and reference numeral 224 denotes an electronic circuit. Reference numeral 227 denotes a stop. Two free-form surface prisms 225 and 226 and two variable-optical-characteristic optical elements 220 and 221 form a variable-field-angle and autofocus optical system. The variable-optical-characteristic optical element 220 is driven by electrostatic force and hence exhibits fast response. Therefore, the optical element 220 performs autofocusing. On the other hand, the variable-optical-characteristic optical element 221 has a slow response speed but is deformable to a considerable extent and hence used to vary the field angle or to change the viewing direction. By using variable-optical-characteristic optical elements driven by different driving methods for different functions in this way, an even more convenient optical apparatus can be realized. The variable-optical-characteristic optical element 221 is a variable mirror driven by a fluid.

The mutually opposing surfaces of the variable mirrors 220 and 221 and optical elements (free-form surface prisms in this example) 225 and 226, which face the variable mirrors 220 and 221, respectively, are concave surfaces. With this arrangement, the angle of incidence of light rays on the variable mirrors 220 and 221 can be minimized. This is advantageous from the viewpoint of aberration correction. In FIG. 41, reference numeral 145 denotes a transparent electrode. Formation of the transparent electrode 145 on the concave surface of the free-form surface prism 225 is advantageous in that the reflecting membrane 228 can also be deformed into a strong convex surface. Such a method of setting a transparent electrically conductive member, e.g. a transparent electrode, can also be used for mirrors using electromagnetic force, magnetostriction, a piezoelectric effect, etc.

Figure 42:
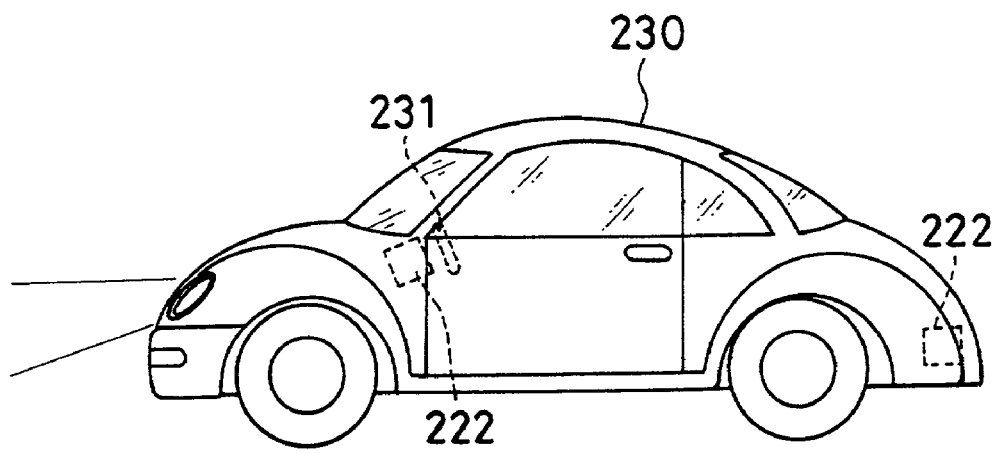
FIG. 42 is a diagram showing the way in which the video camera shown in FIG. 41 is mounted on an automobile, by way of example.

FIG. 42 is a diagram showing the video camera 222 as mounted on an automobile 230. The figure shows an example in which the video camera 222 is used as a TV camera for monitoring cars behind the automobile 230. The figure also shows an example in which the video camera 222 is used as a mobile video telephone mounted near a dashboard 231. The vehicle-mounted video camera 222 may be mounted in a car navigation system or a car audio system.

Figure 43:
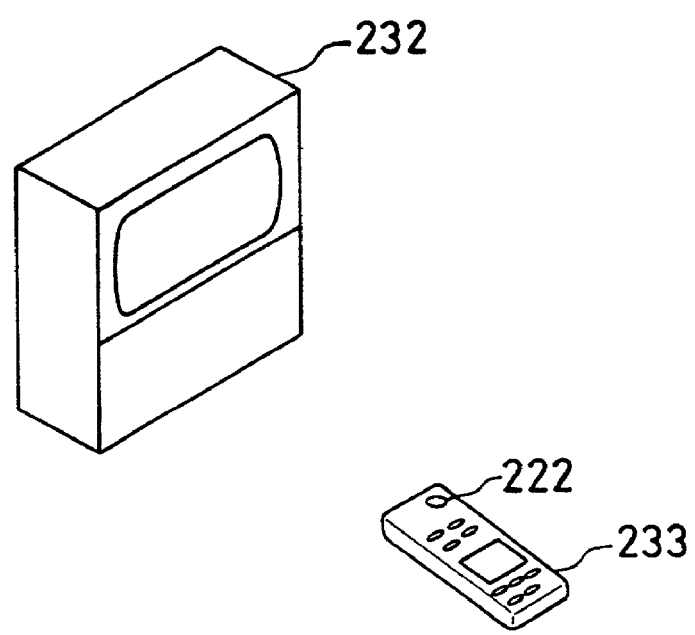
FIG. 43 is a diagram showing the way in which the video camera shown in FIG. 41 is mounted on a remote controller for a television.

FIG. 43 shows an example in which the video camera 222 is mounted on a remote controller 233 for a television 232, e.g. a BS digital TV, a ground wave digital TV, or a cable TV. The video camera 222 allows the user's face, for example, to be sent by two-way communications using a digital TV. This is convenient. The video camera 222 should preferably be used in a cordless remote controller, e.g. a remote controller for a stereo, or a remote controller for a game machine, from the viewpoint of low-power consumption.

Figure 44:
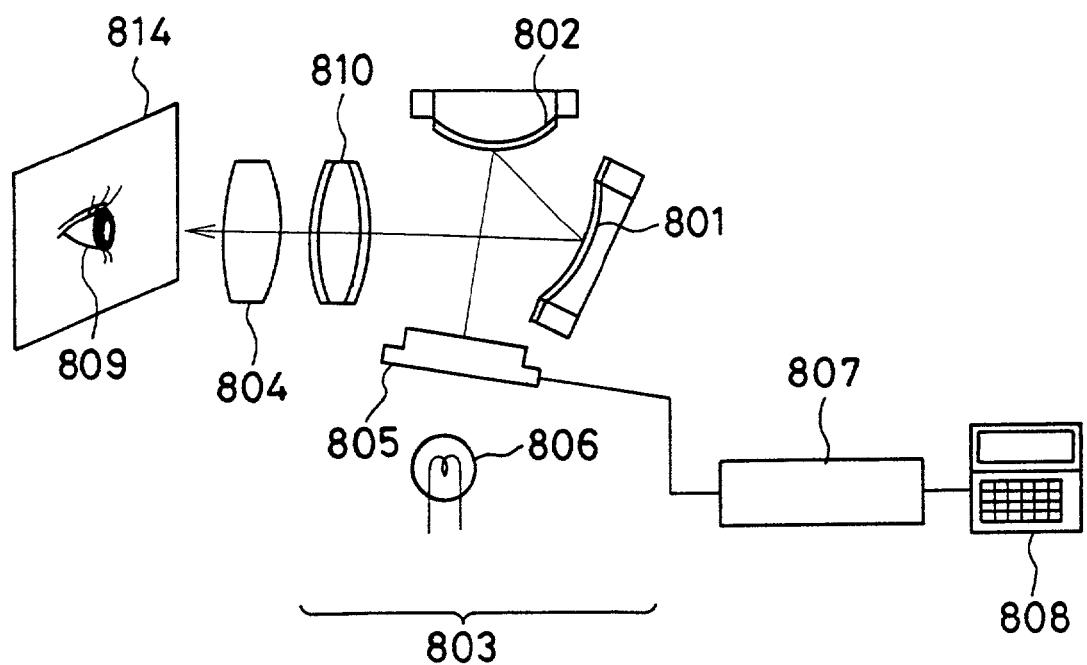
FIG. 44 is a diagram showing the arrangement of an embodiment of a viewfinder type display apparatus using a variable mirror according to the present invention.

FIG. 44 is a diagram showing an example of a viewfinder type display apparatus 803 using variable mirrors 801 and 802. Because two variable mirrors 801 and 802 are used, it is possible to effect zooming, diopter adjustment, magnification change, etc. without moving a lens. Therefore, the viewfinder type display apparatus 803 is convenient. In the figure, reference numerals denote constituent elements as follows: 804 denotes a lens; 805 denotes a display device (e.g. a liquid crystal display device, or an organic EL); 806 denotes a backlight; 807 denotes an electronic circuit; 808 denotes a notebook personal computer; 809 denotes a screen; and 814 denotes a window of the viewfinder type display apparatus. It should be noted that a variable-focus lens 810 may be provided in place of the variable mirror 801 or 802. It is possible to realize zooming, diopter adjustment, magnification change, etc. as long as there are at least two variable-optical-characteristic optical elements. It should be noted that as the variable mirrors 801 and 802 and the variable-focus lens 810, it is possible to use the variable mirrors, the variable-focus lenses, etc. in the other embodiments of the present invention and those stated in the foregoing description.

Figure 45:
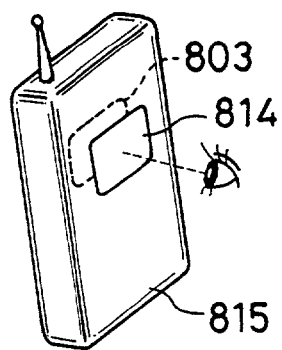
FIG. 45 is a perspective view showing a PDA equipped with a viewfinder type display apparatus such as that shown in FIG. 44.

The above-described viewfinder type display apparatus 803 can be used, as shown in FIG. 45, in a PDA (portable information terminal) 815, a portable telephone, a portable personal computer, an HMD (Head-Mounted Display), etc. The viewfinder type display apparatus 803 may also be used as a viewfinder for a digital camera, a VTR camera, etc. In the examples shown in FIGS. 42 and 43, it is also possible to use the optical system 321 for a zoom digital camera (FIG. 35), the zoom optical system 327 (FIG. 36), the variable-focus lens 190 (FIG. 22), the image pickup unit 141 (FIG. 17), etc. beside the video camera 222, as a matter of course.

The following is a description of an embodiment of a digital camera as an example of optical apparatus to which a variable-optical-characteristic optical element according to the present invention is applicable.

Figure 46:
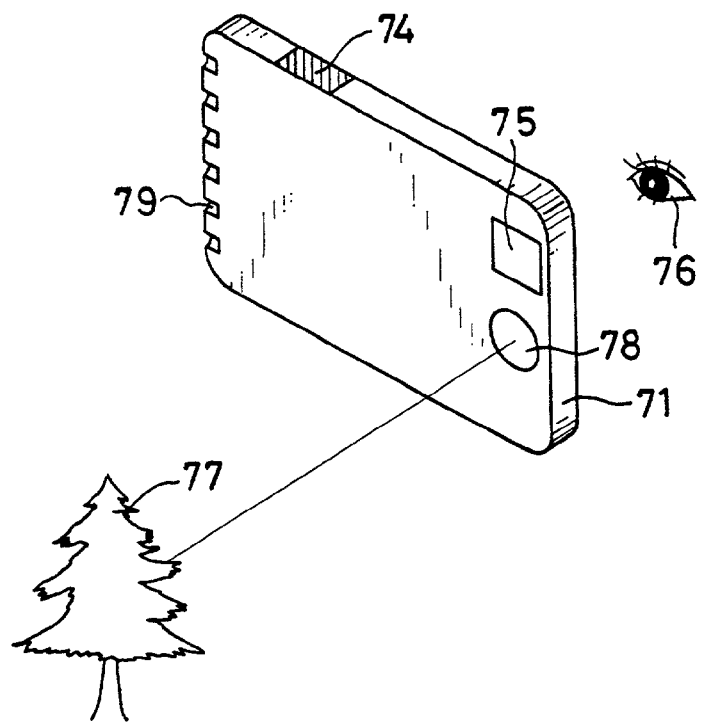
FIG. 46 is a fragmentary perspective view showing a digital camera according to an embodiment of the optical apparatus of the present invention that is in one state of being used for photography.
Figure 47:
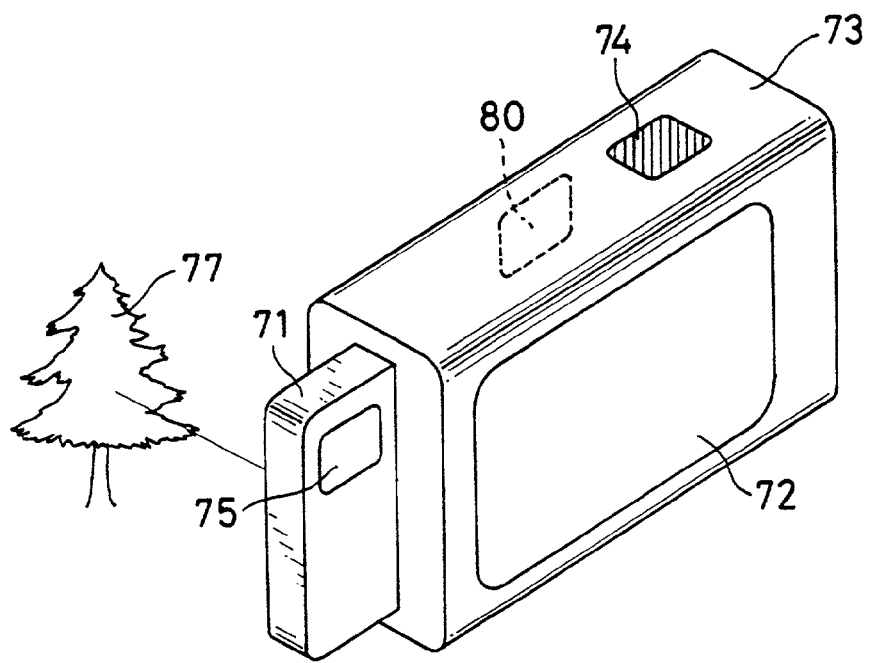
FIG. 47 is a perspective view showing the digital camera according to the embodiment in FIG. 46 that is in another state of being used for photography.

FIG. 46 is a fragmentary perspective view showing a digital camera according to an embodiment of the optical apparatus of the present invention that is in one state of being used for photography. FIG. 47 is a perspective view showing the digital camera according to the embodiment that is in another state of being used for photography.

Examples of the optical apparatus according to the present invention include a digital camera system capable of taking and displaying an image, which comprises a card-type digital camera 71 capable of taking an image alone and having no display apparatus, as shown in FIG. 46, and a casing 73 having a display apparatus 72 and connectable with the card-type digital camera 71, as shown in FIG. 47.

It should be noted that reference numerals in FIG. 46 denote constituent elements as follows: 74 denotes a shutter button; 75 denotes an optical finder; 76 denotes a photographer's eye; 77 denotes a subject; 78 denotes an image pickup system; and 79 denotes contacts for electrical connection with the casing. Reference numeral 80 in FIG. 47 denotes a flash provided on the casing to face toward the object plane.

According to this embodiment, images can be taken by using the card-type digital camera 71 singly as a digital camera for imaging only. Further, the card-type digital camera 71 can be accommodated in the casing 73 and can take an image in the accommodated state. In this case, the taken image can be viewed on the display apparatus 72. Accordingly, when the display apparatus 72 is not necessary, the card-type digital camera 71 alone can be used as a lightweight digital camera to take images. When the display apparatus 72 is necessary, the card-type digital camera 71 can be used in combination with the casing 73.

According to this embodiment, even when the definition of solid-state image pickup devices to be built in digital cameras becomes higher as technology progresses, it is only necessary to change the card part to an upgraded one. Thus, it is possible to keep the whole system from becoming obsolescent.

Figure 48:
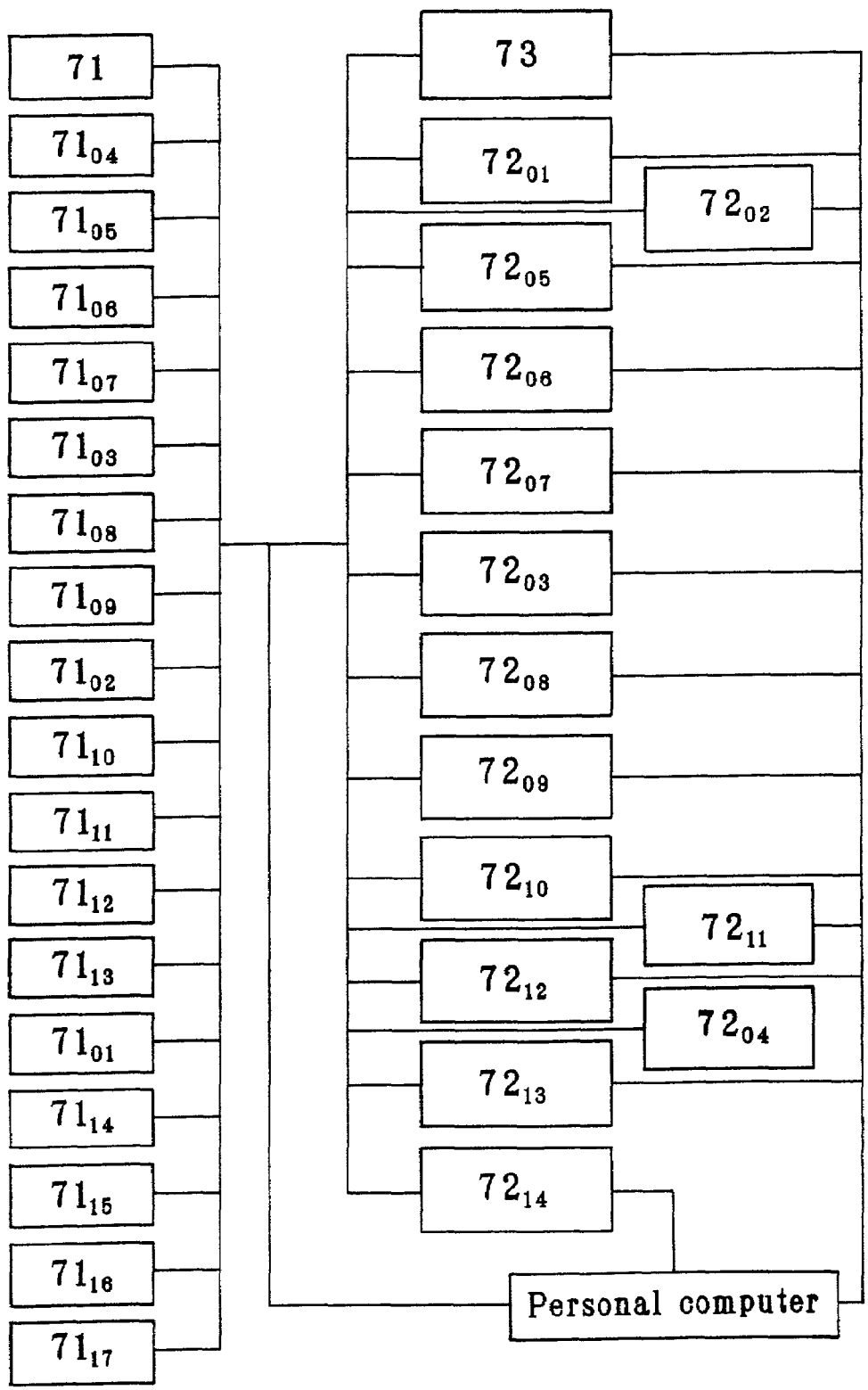
FIG. 48 is a diagram showing a system of optical apparatus according to the present invention that is applicable to the embodiment shown in FIG. 46.

This will be explained below with reference to FIG. 48. FIG. 48 is a diagram showing a system of optical apparatus according to the present invention that is applicable to this embodiment.

In this system, an optical apparatus can be constructed by combining together a card and a casing respectively selected from a group of cards shown in the left-hand part of FIG. 48 (i.e. a wide-angle lens card 71, a standard lens card $71_{04}$, a telephoto lens card $71_{05}$, a zoom lens card $71_{06}$, a close-up lens card $71_{07}$, a compound-eye thin type card $71_{03}$, a stereo lens card $71_{08}$, a VTR camera card $71_{09}$, a TV and FM card $71_{02}$, a BS digital card $71_{10}$, a navigation card $71_{11}$, a portable telephone card $71_{12}$, an AUDIO card $71_{13}$, a high-definition card $71_{01}$, a MOS card $71_{14}$, a solar battery card $71_{15}$, a wide-angle lens and AUDIO card $71_{16}$, and a wide-angle lens and battery card $71_{17}$) and a group of casings shown in the right-hand part of FIG. 48 (i.e. an LCD casing 73, a high-definition LCD casing $72_{01}$, an LCD and speaker casing $72_{02}$, a paper display casing $72_{05}$, an organic EL casing $72_{06}$, a solar battery casing $72_{07}$, an additional battery casing $72_{03}$, a front conversion lens casing (close-up, wide-angle, and telephoto) $72_{08}$, an additional memory casing $72_{09}$, a PDA (Personal Digital Assistant) casing $72_{10}$, a TV and BS digital casing $72_{11}$, a portable personal computer casing $72_{12}$, a radio casing $72_{04}$, a portable telephone casing $72_{13}$, and a data transfer casing $72_{14}$). It should be noted that each of the cards and casings is arranged to be capable of functioning alone.

FIG. 48 shows various embodiments in which a "card" and a "casing" can be combined together.

The card-type digital camera 71 according to this embodiment corresponds to one of the cards (in FIG. 48, it corresponds to the wide-angle lens card). The casing 73 corresponds to one of the casings (in FIG. 48, it corresponds to the LCD casing).

When the definition of solid-state image pickup devices to be built in card-type digital cameras has become higher, a card-type digital camera $71_{01}$ having a high-definition solid-state image pickup device and capable of being combined with the existing casings should be newly produced. In such a case, the user needs to buy only the high-definition card-type digital camera $71_{01}$. By doing so, the user can use the casing 73 in combination with the high-definition card-type digital camera $71_{01}$. Accordingly, the cost is lower than in the case of buying a high-definition digital camera having an image pickup device and a display device fixedly mounted in a single box.

Conversely, when a high-definition LCD has been developed and become producible at reduced costs, a casing (high-definition LCD casing) $72_{01}$, having a high-definition LCD (Liquid Crystal Display), which is shown in FIG. 48, should be developed. In such a case, the user needs to buy only the high-definition LCD casing $72_{01}$. By doing so, the user can use the card-type digital camera 71, $71_{01}$, etc. in combination with the high-definition LCD casing $72_{01}$. Accordingly, the cost is lower than in the case of newly buying a digital camera with a high-definition LCD.

It should be noted that in FIG. 48 the devices referred to as "xx cards" (71 and $71_n$, where n represents numbers 01, 02 . . . ) each have an image pickup system incorporated therein in principle and are therefore capable of taking images alone. Further, the devices include functions designated by their names.

Further, the devices referred to as "xx casings" (73 and $72_n$, where n represents numbers 01, 02 . . . ) each have a display device incorporated therein in principle and are arranged to perform functions designated by their names.

However, among the above-described cards, those which can function alone without an image pickup function may be arranged without an image pickup system. For example, the TV and FM card $71_{02}$ falls under this category. The TV and FM card $71_{02}$ is arranged to have the function of receiving various kinds of broadcasting, i.e. TV, FM, and AM. By combining the TV and FM card $71_{02}$ with the LCD and speaker casing $72_{02}$, for example, it is possible to watch TV images with sound.

Casings that can function alone without a display apparatus, e.g. the additional battery casing $72_{03}$, may be arranged without a display apparatus. The additional battery casing $72_{03}$ is a casing arranged to supply an additional battery power so that a long-time image pickup operation can be realized by combination with a card. The solar battery casing $72_{07}$ is also a casing arranged to supply an electric current through a solar battery.

Some casings can function alone without being combined with a card, as in the case of the radio casing $72_{04}$. The radio casing $72_{04}$ is arranged to function alone as a radio for receiving FM, AM or SW signals.

Casings equipped with a display apparatus may be arranged to have a paper display capable of wrapping each card. The paper display casing $72_{05}$ functions as a display apparatus and also serves to protect the card from an external shock like a leather or cloth casing for a conventional camera.

Figure 49:
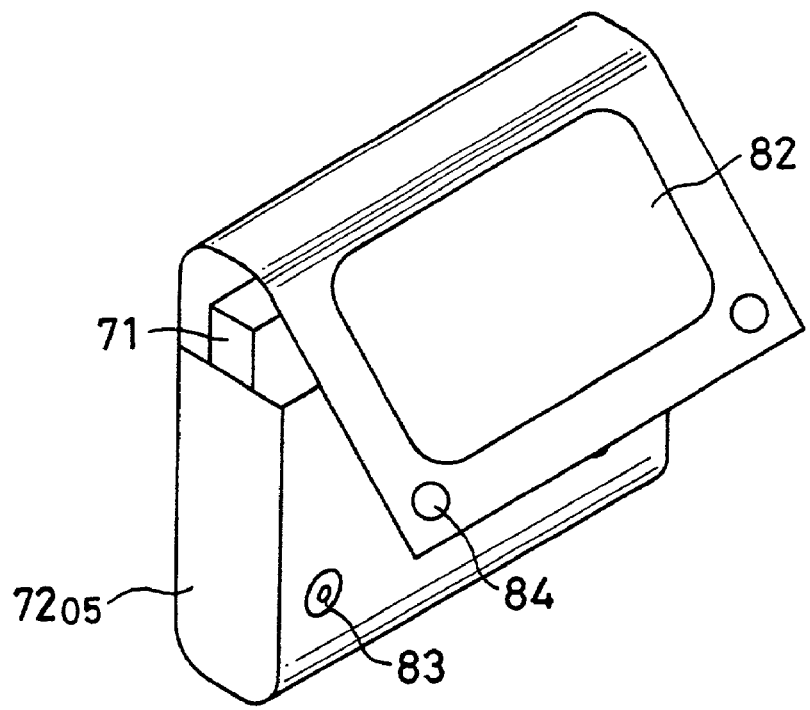
FIG. 49 is a diagram illustrating the way in which a paper display casing and a card-type digital camera are combined together.

FIG. 49 shows the way in which the paper display casing $72_{05}$ and the card-type digital camera 71 are combined together.

The paper display casing $72_{05}$ is arranged to be capable of taking images in the state of accommodating the card-type digital camera 71 therein.

It should be noted that, in FIG. 49, reference numeral 82 denotes a paper display. Reference numeral 83 denotes a convex button, and reference numeral 84 denotes a concave button. By fitting the buttons 83 and 84 to each other, the accommodated card 71 can be secured so as not to jump out of the paper display casing $72_{05}$.

Each of the cards and casings shown in FIG. 48 may be arranged so that it can be connected directly to a personal computer.

With the above-described arrangement, it is possible to perform processing, storage, transfer, etc. of images, characters, sound, power supply, etc. through the personal computer.

In the example of the digital camera shown in FIGS. 46 and 47, the connection of a card and a casing has been described with regard to an arrangement based on the assumption that the card and the casing are connected together through mechanical contacts. It should be noted, however, that the present invention is not necessarily limited to the described arrangement. The arrangement may be such that a card and a casing are connected together by connection through a cable, or optical communication connection using light (infrared), or wireless connection, e.g. Bluetooth.

The compound-eye thin type card $71_{03}$ is a card-type digital camera arranged so that the card is particularly thin in thickness. The thickness is reduced by using a compound eye in the image pickup system.

Figure 50:
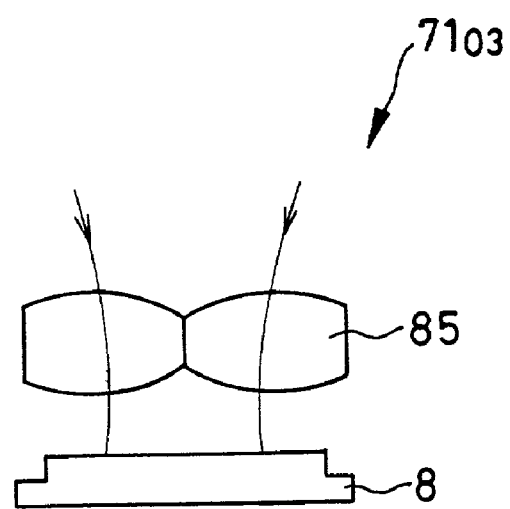
FIG. 50 is a diagram illustrating an embodiment of a compound-eye thin type card.

FIG. 50 is a diagram illustrating an embodiment of a compound-eye thin type card. The compound-eye thin type card $71_{03}$ in this embodiment has four lenses 85 placed on the object side of a solid-state image pickup device 8 in the card in such a manner that the lenses 85 are in close proximity to the solid-state image pickup device 8. In FIG. 50, however, two lenses on the reverse side of the plane of the figure are hidden by the other two lenses.

According to the compound-eye thin type card $71_{03}$ of this embodiment, four divided inverted images are formed on the solid-state image pickup device 8 through the lenses 85. The four divided inverted images are connected together into one image by image processing executed thereafter through an image processing device, e.g. a personal computer, thereby obtaining an image similar to that obtained by using a card containing a conventional optical system.

The lens arrangement of the compound-eye thin type card $71_{03}$ in this embodiment is applicable to all the image pickup systems in the image pickup apparatus and optical products according to the present invention. For example, it is usable in the image pickup system 78 shown in FIG. 46 and also usable in an image pickup system 78 shown in FIG. 52 (described later).

Figure 51:
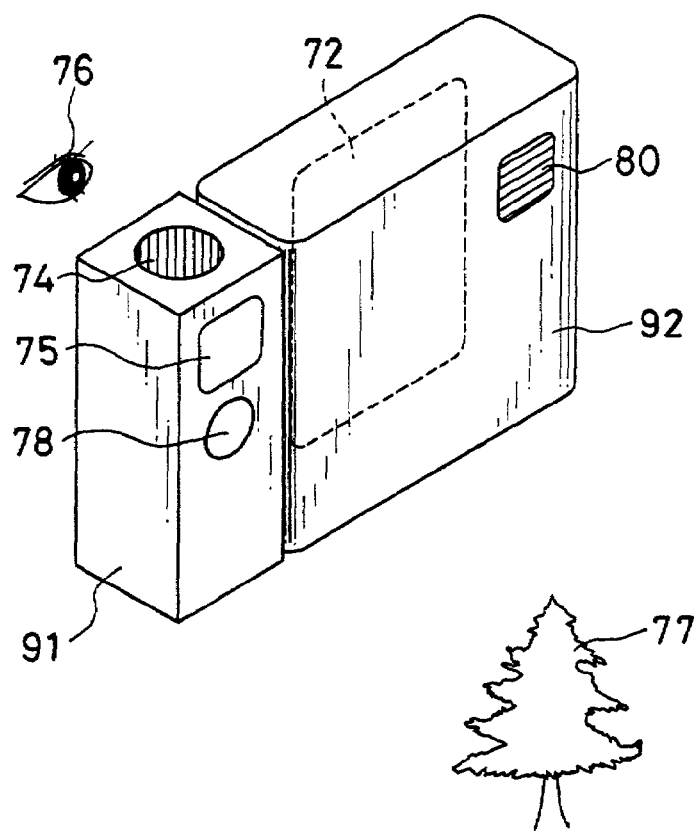
FIG. 51 is a perspective view showing another embodiment of the optical apparatus according to the present invention.

FIG. 51 is a perspective view showing another embodiment of the optical apparatus according to the present invention.

In the optical apparatus according to this embodiment, each "card" and each "casing" constituting the system shown in FIGS. 46 to 48 are formed into two box-shaped configurations, respectively. In FIG. 51, reference numeral 91 denotes an image pickup box A, which has a function similar to that of the card-type digital camera 71 shown in FIGS. 46 to 48. Reference numeral 92 denotes a display box B, which has a function similar to that of the casing 73 shown in FIGS.

46 to 48. Other constituent members in FIG. 51 that are similar to those shown in, FIGS. 46 and 47 are denoted by the same reference numerals, and a description thereof is omitted.

It should be noted that the boxes A and B are connectable with each other through screws, a bayonet coupling, etc. The box A is arranged to be capable of taking images either alone or in the state of being connected with the box B.

The boxes A and B can be arranged in the form of a great variety of boxes having functions equivalent to the "casings" and "cards" shown in FIG. 48.

Figure 52:
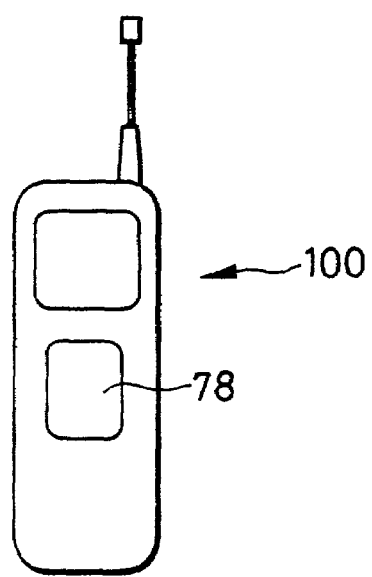
FIG. 52 is a schematic view showing still another embodiment of the optical apparatus according to the present invention.

FIG. 52 is a schematic view showing still another embodiment of the optical apparatus according to the present invention. The optical apparatus according to this embodiment is a portable telephone 100 having an image pickup system 78. The image pickup system 78 should preferably be arranged to include a variable-optical-characteristic optical element as described above. The use of a variable-optical-characteristic optical element allows focusing or zooming to be effected with a lower power consumption than in the case of moving the lenses by using a motor. As the image pickup system 78, it is possible to use the image pickup unit 141 in FIG. 31, the electronic image pickup apparatus 241 in FIG. 37, or the variable-focus lens 190 in FIG. 22, by way of example. The image pickup system 78 including a variable-optical-characteristic optical element should preferably be arranged to be capable of focusing to take an image so that it is possible to take a close-up of an object such as a flower or an insect.

It should be noted that the image pickup system 78 may be arranged as an external electronic image pickup apparatus, instead of providing it as an integral part of the portable telephone 100, so that the image pickup system 78 can be attached to the portable telephone 100 as an adapter.

The image pickup system 78 is also usable with a digital camera, a video telephone, etc.

It is also possible to provide the image pickup system 78 in a conventional immobile telephone installed indoors.

Further, the image pickup system 78 may be used as an image input device or an information sending device by providing it in a BS digital television, a remote controller for a BS digital television, a game machine, a remote controller for a game machine, a mouse used with a personal computer, a keyboard of a personal computer, a monitor of a personal computer, etc.

If the image pickup system 78 having a variable-optical-characteristic optical element is used in various apparatus such as those mentioned above, the apparatus can be reduced in size, weight and power consumption, advantageously.

Figure 53:
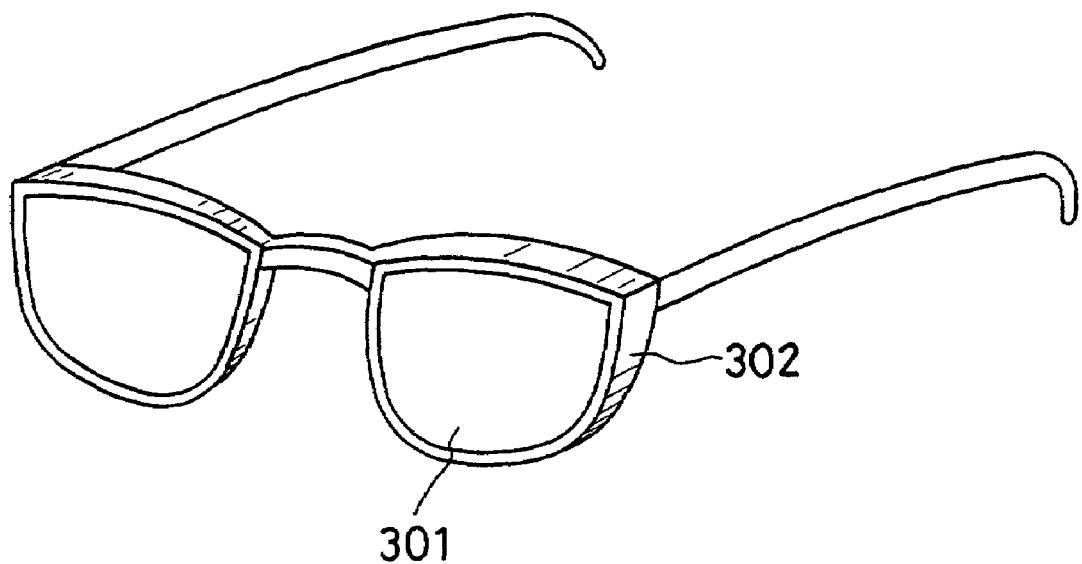
FIG. 53 is a diagram illustrating variable-focus eyeglasses using variable-focus lenses according to a further embodiment of the optical apparatus of the present invention.

FIG. 53 is an illustration of variable-focus eyeglasses 302 using the above-described variable-focus lenses 301 according to a further embodiment of the optical apparatus to which the variable-optical-characteristic optical element of the present invention is applicable.

As a person ages, the focus control action of his/her eyes becomes weak. However, the use of eyeglasses with the variable-focus lenses 301 makes it possible to see in-focus images throughout the object distance range from the near point to the far point. This is very convenient.

It should be noted that the term "piezoelectric effect" as used in this application shall include an electrostrictive effect.

Similarly, the term "piezoelectric material" shall include electrostrictive materials.

The image pickup apparatus using variable-optical-characteristic optical elements stated in the description of the present invention should preferably be provided in the following products or articles from the viewpoint of low power consumption, resistance to shock, compact and lightweight structure, and so forth:

The dashboard of an automobile; the instrument panel of an automobile; a W-CDMA (IMT-2000) (next-generation portable telephone); a player for DVD, CD, MD, etc.; a portable player for DVD, CD, MD, etc.; a car audio control panel; a car navigation system; eyeglasses; variable-focus eyeglasses; an HMD (Head-Mounted Display); a TV; an HD-TV; a BS digital TV; a notebook personal computer; a personal computer; a mouse; a keyboard; a PDA; a liquid crystal monitor; a home theater; a game machine; a headphone stereo; an audio system; a stereo amplifier; a tuner; a cassette deck; a remote controller for DVD, CD, etc.; a speaker; a bicycle; an automobile; a bus; a motorcycle; a motor scooter; a helmet; a streetcar; a train; an airplane; a boat; a ship; and so forth.

It should be noted that an image pickup apparatus having no variable-optical-characteristic optical element may be provided in the above-described products. The reason for this is that it is more convenient than using a TV camera, a digital camera, etc. separately.

Finally, let us state the definition of each term used in the present invention.

The term "optical apparatus" means an apparatus including an optical system or an optical element. The optical apparatus need not be capable of functioning alone. In other words, the optical apparatus may be a part of a system.

The optical apparatus include image pickup apparatus, viewing apparatus, display apparatus, illuminating apparatus, signal processing apparatus, etc.

Examples of image pickup apparatus are a film-with-lens camera, a digital camera, a robot's eye, an interchangeable-lens digital single-lens reflex camera, a video camera, an animation recorder, an electronic animation recorder, a camcorder, a VTR camera, and a video endoscope.

Examples of viewing apparatus are a microscope, a telescope, eyeglasses, binoculars, a magnifier, a fiberscope, a finder, and a viewfinder.

Examples of display apparatus are a liquid crystal display, a viewfinder, a game machine (e.g. PlayStation, available from Sony Corporation), a video projector, a liquid crystal projector, a head-mounted display (HMD), a PDA (portable information terminal), and a portable telephone.

Examples of illuminating apparatus are a flash of a camera, a headlight of an automobile, an endoscope light source, and a microscope light source.

Examples of signal processing apparatus are a portable telephone, a personal computer, an optical disk read/write apparatus, and a computing unit of an optical computer.

The term "image pickup device" means, for example, a CCD, an image pickup tube, a solid-state image pickup device, and a photographic film. Further, plane-parallel plates shall be included among prisms. Changes in the observer shall include a change in diopter. Changes in the subject shall include a change in the distance to an object as a subject, a movement of the object, a motion and vibration of the object, a shaking of the object, etc.

It should be noted that all digital cameras, video cameras, VTR cameras, animation recording cameras, etc. are examples of electronic image pickup apparatus.

The definition of "extended curved surfaces" is as follows.

The surfaces may have any configuration, e.g. a. spherical surface, a plane surface, a rotationally symmetric aspherical surface, a spherical surface decentered with respect to an optical axis, a plane surface decentered with respect to an optical axis, a rotationally symmetric aspherical surface decentered with respect to an optical axis, an aspherical surface having planes of symmetry, an aspherical surface having only one plane of symmetry, an aspherical surface having no plane of symmetry, a free-form surface, or a surface having non-differentiable points or lines. The surfaces may be any surfaces that can have some effect on light, whether reflecting surfaces or refracting surfaces. In the present invention, these surfaces are generically called "extended curved surfaces".

Free-form surfaces used in the present invention are defined by the following equation. The Z-axis of the defining equation is the axis of a free-form surface.

$$Z = cr^2/[1 + \sqrt{1-(1+k)c^2 r^2}] + \sum_{j=2}^{66} C_j X^m Y^n \quad (a)$$

In Eq. (a), the first term is a spherical surface term, and the second term is a free-form surface term.

In the spherical surface term:

c: the curvature at the vertex k: a conic constant $r = \sqrt{(X^2 + Y^2)}$

The free-form surface term is given by $$\sum_{j=2}^{66} C_j X^m Y^n = C_2 X + C_3 Y + C_4 X^2 + C_5 XY + C_6 Y^2 + C_7 X^3 + C_8 X^2 Y +$$
$$C_9 XY^2 + C_{10} Y^3 + C_{11} X^4 + C_{12} X^3 Y + C_{13} X^2 Y^2 + C_{14} XY^3 +$$
$$C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 + C_{29} X^7 +$$
$$C_{30} X^6 Y + C_{31} X^5 Y^2 + C_{32} X^4 Y^3 + C_{33} X^3 Y^4 + C_{34} X^2 Y^5 +$$
$$C_{35} XY^6 + C_{36} Y^7 \ldots$$

where $C_j$ (j is an integer of 2 or higher) are coefficients.

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. A free-form surface having only one plane of symmetry parallel to the XZ-plane is obtained by making all terms of odd-numbered degrees with respect to Y zero.

In addition, free-form surfaces as the above-described surfaces with a rotationally asymmetric curved surface configuration may be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), A is the distance from the Z-axis in the XY-plane, and R is the azimuth angle about the Z-axis, which is expressed by the angle of rotation measured from the Z-axis.

$$x = R \times \cos(A) \quad (b)$$
$$y = R \times \sin(A)$$

-continued $$Z = D_2 + D_3 R\cos(A) + D_4 R\sin(A) +$$
$$D_5 R^2 \cos(2A) + D_6 (R^2 - 1) +$$
$$D_7 R^2 \sin(2A) + D_8 R^3 \cos(3A) +$$
$$D_9 (3R^3 - 2R)\cos(A) + D_{10}(3R^3 - 2R)\sin(A) +$$
$$D_{11} R^3 \sin(3A) + D_{12} R^4 \cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16} R^4 \sin(4A) + D_{17} R^5 \cos(5A) +$$
$$D_{18}(5R^5 - 4R^3)\cos(3A) + D_{19}(10R^5 - 12R^3 + 3R)\cos(A) +$$
$$D_{20}(10R^5 - 12R^3 + 3R)\sin(A) + D_{21}(5R^5 - 4R^3)\sin(3A) +$$
$$D_{22} R^5 \sin(5A) + D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A) \ldots$$

where $D_m$ (m is an integer of 2 or higher) are coefficients.

It should be noted that to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ ... should be used.

The above defining equations are shown to exemplify surfaces with a rotationally asymmetric curved surface configuration. Therefore, the same advantageous effects can be obtained for any other defining equation that expresses such a rotationally asymmetric curved surface configuration. The curved surface configuration may be expressed by other defining equations as long as they are mathematically equivalent to the above equation.

It should be noted that other examples of defining equations for free-form surfaces include the following defining equation (c):

$$Z = \Sigma\Sigma C_{nm} XY$$

Assuming that k=7 (polynomial of degree 7), for example, a free-form surface is expressed by an expanded form of the above equation as follows:

$$Z = C_2 + C_3 Y + C_4 |X| + C_5 Y^2 + C_6 Y|X| + C_7 X^2 + \quad (c)$$
$$C_8 Y^3 + C_9 Y^2 |X| + C_{10} YX^2 + C_{11} |X^3| +$$
$$C_{12} Y^4 + C_{13} Y^3 |X| + C_{14} Y^2 X^2 + C_{15} Y|X^3| + C_{16} X^4 +$$
$$C_{17} Y^5 + C_{18} Y^4 |X| + C_{19} Y^3 X^2 + C_{20} Y^2 |X^3| +$$
$$C_{21} YX^4 + C_{22} |X^5| + C_{23} Y^6 + C_{24} Y^5 |X| + C_{25} Y^4 X^2 +$$
$$C_{26} Y^3 |X^3| + C_{27} Y^2 X^4 + C_{28} Y|X^5| + C_{29} X^6 + C_{30} Y^7 +$$
$$C_{31} Y^6 |X| + C_{32} Y^5 X^2 + C_{33} Y^4 |X^3| + C_{34} Y^3 X^4 +$$
$$C_{35} Y^2 |X^5| + C_{36} YX^6 + C_{37} |X^7|$$

Aspherical surfaces used in the present invention are rotationally symmetric aspherical surfaces given by the following equation:

$$Z = \quad (d)$$
$$(Y^2/R)/\left[1 + \{1 - (1+K)Y^2/R^2\}^{1/2}\right] + AY^4 + BY^6 + CY^8 + DY^{10} + \ldots$$

In the above equation, Z is an optical axis (axial principal ray) for which the direction of travel of light is defined as a positive direction, and Y is taken in a direction perpendicular to the optical axis. R is a paraxial curvature radius, K is a conic constant, and A, B, C, D . . . are 4th-, 6th-, 8th- and 10th-order aspherical coefficients, respectively. The Z-axis of this defining equation is the axis of the rotationally symmetric aspherical surface.

The configuration of an anamorphic surface is defined by the following equation. A straight line passing through the origin of the surface configuration perpendicularly to the optical surface is the axis of the anamorphic surface.

$$Z = (Cx \cdot X^2 + Cy \cdot Y^2)/[1 + \{1 - (1+Kx)Cx^2 \cdot X^2 -$$
$$(1+Ky)Cy^2 \cdot Y^2\}^{1/2}] + \sum Rn\{(1-Pn)X^2 + (1+Pn)Y^2\}^{(n+1)}$$

Assuming that n=4 (polynomial of degree 4), for example, an anamorphic surface may be expressed by an expanded form of the above equation as follows:

$$Z = (Cx \cdot X^2 + Cy \cdot Y^2)/[1 + \{1 - (1+Kx)Cx^2 \cdot X^2 - \quad (e)$$
$$(1+Ky)Cy^2 \cdot Y^2\}^{1/2}] + R1\{(1-P1)X^2 + (1+P1)Y^2\}^2 +$$
$$R2\{(1-P2)X^2 + (1+P2)Y^2\}^3 + R3\{(1-P3)X^2 +$$
$$(1+P3)Y^2\}^4 + R4\{(1-P4)X^2 + (1+P4)Y^2\}^5$$

where Z is the amount of deviation from a plane tangent to the origin of the surface configuration; Cx is the curvature in the X-axis direction; Cy is the curvature in the Y-axis direction; Kx is the conic coefficient in the X-axis direction; Ky is the conic coefficient in the Y-axis direction; Rn is the rotationally symmetric component of the aspherical surface term; and Pn is the rotationally asymmetric component of the aspherical surface term.

It should be noted that the radius of curvature Rx in the X-axis direction and the radius of curvature Ry in the Y-axis direction are related to the curvatures Cx and Cy as follows:

$$Rx=1/Cx, Ry=1/Cy$$

Toric surfaces include an X-toric surface and a Y-toric surface, which are defined by the following equations, respectively. A straight line passing through the origin of the surface configuration perpendicularly to the optical surface is the axis of the toric surface. The X-toric surface is given by $$F(X) = Cx \cdot X^2 / \left[1 + \{1 - (1+K)Cx^2 \cdot X^2\}^{1/2}\right] + \quad (f)$$
$$AX^4 + BX^6 + CX^8 + DX^{10} \ldots$$
$$Z = F(X) + (1/2)Cy\{Y^2 + Z^2 - F(X)^2\}$$

Then, the surface is rotated around the X-axis, passing through the center of curvature in the Y-direction. As a result, the surface becomes aspherical in the XZ-plane and circular in the YZ-plane.

The Y-toric surface is given by $$F(Y) = Cy \cdot Y^2 / \left[1 + \{1 - (1+K)Cy^2 \cdot Y^2\}^{1/2}\right] + \quad (g)$$
$$AY^4 + BY^6 + CY^8 + DY^{10} \ldots$$
$$Z = F(Y) + (1/2)Cx\{X^2 + Z^2 - F(Y)^2\}$$

Then, the surface is rotated around the Y-axis, passing through the center of curvature in the X-direction. As a result, the surface becomes aspherical in the YZ-plane and circular in the XZ-plane.

In the above equations, Z is the amount of deviation from a plane tangent to the origin of the surface configuration; Cx is the curvature in the X-axis direction; Cy is the curvature in the Y-axis direction; K is a conic coefficient; and A, B, C and D are aspherical coefficients, respectively. It should be noted that the radius of curvature Rx in the X-axis direction and the radius of curvature Ry in the Y-axis direction are related to the curvatures Cx and Cy as follows:

$$Rx=1/Cx, Ry=1/Cy$$

The term "variable-optical-characteristic optical element" includes a variable-focus lens, a variable mirror, a variable prism whose surface configuration is variable, a variable-apex angle prism, a prism whose light-deflecting action is variable, variable diffractive optical elements whose light-deflecting action is variable, i.e. a variable HOE and a variable DOD, and so forth.

The term "variable-focus lens" also includes a variable lens in which the focal length is invariable but the amount of aberration is variable. The same is the case with the term "variable mirror".

In short, optical elements in which a light-deflecting action such as reflection, refraction, or diffraction, is changeable are called "variable-optical-characteristic optical elements".

The term "information sending apparatus" means apparatus capable of inputting and transmitting some information, e.g. a portable telephone, an immobile telephone, remote controllers for a game machine, a television, a radio-cassette player, a stereo, etc., a personal computer, a keyboard, a mouse, a touch panel, etc. for use with a personal computer, and so forth.

The information sending apparatus shall also include a television monitor with an image pickup apparatus, and a monitor and display for use with a personal computer.

The information sending apparatus are included in the signal processing apparatus.

As has been stated above, it is possible according to present invention to obtain optical apparatus, display apparatus, signal processing apparatus, image pickup apparatus, etc. that are compact, lightweight, inexpensive and capable of readily extending their capabilities.

What we claim is:

1. A variable-optical-characteristic optical unit, comprising:
    a variable-focus optical element having a fluid portion, and an electrode adjacent to said fluid portion; and
    a power source unit and a driving circuit for driving said variable-optical-characteristic optical unit, wherein:
    said power source unit or driving circuit includes a booster member that is connected to the power source unit and generates a voltage necessary in said driving circuit, wherein the booster member includes a transformer using a coil or a piezoelectric transformer, and said variable-optical-characteristic optical unit is capable of achieving optical deflection.

2. A variable-optical-characteristic optical unit according to claim 1, wherein electrostatic force or piezoelectric effect is used for driving said variable-optical-characteristic optical unit.

3. A variable-optical-characteristic optical unit having a deformable optical surface, comprising:
  a variable-optical-characteristic optical unit having said deformable optical surface; and
  a control system for driving said variable-optical-characteristic optical unit, wherein said variable-optical-characteristic optical unit includes a fluid portion for deforming said deformable optical surface and an electrode adjacent to said fluid portion, and said control system includes a booster member that is connected to a power source, and for applying a voltage necessary for driving said variable-optical-characteristic optical unit,
  wherein the booster member includes a transformer using a coil or a piezoelectric transformer.

4. The variable-optical-characteristic optical unit according to claim 3, which is a varifocal lens or a variable mirror.

5. An imaging system, comprising an image pickup device and an imaging optical system for which a variable-optical-characteristic optical unit as recited in any one of claims 1, 3, and 4 is used.

6. A cellular phone having said imaging system as recited in claim 5.

7. An imaging system including a display unit, comprising
  a variable-focus optical element,
  a power source unit and a driving circuit for driving said variable-focus optical element,
  a computing unit,
  an image pickup device,
  an imaging optical system, wherein said power source unit or said driving circuit includes a booster member that is connected to a power source, and generates a voltage necessary in said driving circuit, and
  a display configured to be in communication with and to display an output signal from the variable-focus optical element,
  said variable-focus optical element is capable of achieving optical deflection,
  said computing unit examines a high-frequency component of each image picked up while being defocused, and the position where the high-frequency component reaches a maximum is determined to be an in-focus position, and
  said variable-focus optical element is used for autofocusing of said imaging optical system.

8. An imaging system including a display unit, comprising
  a variable-focus optical element having a deformable optical surface,
  a control system for driving said variable-focus optical element,
  a computing unit,
  an image pickup device,
  an imaging optical system, wherein said control system includes a booster member that is connected to a power source, and operable to apply a voltage necessary for driving said variable-focus optical element, and
  a display configured to be in communication with and to display an output signal from the variable-focus optical element,
  said computing unit examines a high-frequency component of each image picked up while being defocused, and the position where the high-frequency component reaches a maximum is determined to be an in-focus position, and
  said variable-focus optical element is used for autofocusing of said imaging optical system.

9. A cellular phone having said imaging system as recited in claims 7 or 8.

* * * * *